United States Patent
Minato et al.

(10) Patent No.: US 11,797,707 B2
(45) Date of Patent: Oct. 24, 2023

(54) NON-TRANSITORY COMPUTER-READABLE RECORDING MEDIUM HAVING STORED THEREIN INFORMATION PROCESSING PROGRAM, INFORMATION PROCESSING METHOD, AND INFORMATION PROCESSING APPARATUS

(71) Applicant: FUJITSU LIMITED, Kawasaki (JP)

(72) Inventors: Masako Minato, Kawasaki (JP); Kenichi Horio, Yokohama (JP); Masataka Sakaguchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 112 days.

(21) Appl. No.: 17/108,627

(22) Filed: Dec. 1, 2020

(65) Prior Publication Data

US 2021/0224417 A1 Jul. 22, 2021

(30) Foreign Application Priority Data

Jan. 22, 2020 (JP) ................................. 2020-008176

(51) Int. Cl.
*G06F 21/62* (2013.01)
(52) U.S. Cl.
CPC ................................. *G06F 21/6245* (2013.01)
(58) Field of Classification Search
None
See application file for complete search history.

(56) References Cited

U.S. PATENT DOCUMENTS

| | | | |
|---|---|---|---|
| 10,079,835 B1 | 9/2018 | Dodke et al. | |
| 11,106,769 B2 * | 8/2021 | Ohtani | G06F 21/316 |
| 2005/0289340 A1 * | 12/2005 | Camenisch | G06F 21/6245 |
| | | | 713/165 |
| 2011/0145918 A1 * | 6/2011 | Jung | G06F 21/552 |
| | | | 726/22 |
| 2017/0109541 A1 | 4/2017 | Ionescu et al. | |
| 2018/0113997 A1 * | 4/2018 | Tanigawa | G06F 21/84 |

FOREIGN PATENT DOCUMENTS

| | | |
|---|---|---|
| JP | 2017-188771 A | 10/2017 |
| JP | 2018-072957 A | 5/2018 |
| JP | 2019-098575 A | 6/2019 |

OTHER PUBLICATIONS

Sasaki, JP2011076504 English Machine Translation, "Virtual Machine, Program for Ther Same, System and Method for Providing Application Service"; Apr. 14, 2011 (Year: 2011).*

Extended European Search Report dated May 6, 2021 for corresponding European Patent Application No. 20210619.1, 9 pages.

* cited by examiner

*Primary Examiner* — Alexander Lagor
*Assistant Examiner* — Felicia Farrow
(74) *Attorney, Agent, or Firm* — Fujitsu Patent Center

(57) ABSTRACT

A non-transitory computer-readable recording medium having stored therein an information processing program that causes a computer to execute a process includes: extracting second data through executing a first process on first data including sensitive information; outputting fourth data obtained by executing the first process on third data, the third data being obtained by executing a second process to delete sensitive information on the first data; and determining, based on a result of comparing the second data with the fourth data, whether or not the first process uses sensitive information.

12 Claims, 31 Drawing Sheets

FIG.10

EXAMPLE OF PROCESSING PART INFORMATION 11d

| ID | PROCESSING PART | INPUT PORT | OUTPUT PORT |
|---|---|---|---|
| 1 | INPUT DEVICE | — | IMAGE INPUT |
| 2 | MOVING OBJECT DETECTION | IMAGE INPUT | 1: IMAGE OUTPUT, 2: DATA OUTPUT (PRESENCE OR ABSENCE OF MOVEMENT) |
| 3 | FACE RECOGNITION | IMAGE INPUT | 1: IMAGE OUTPUT, 2: DATA OUTPUT (NAME OF PERSON), 3: DATA OUTPUT (SUCCEED IN RECOGNITION OR NOT) |
| 4 | SOUND BUZZER | DATA INPUT | — |
| 5 | STORING INTO DB | DATA INPUT | — |

FIG.11

EXAMPLE OF GRAPH INFORMATION 11e

| PROCESSING PART | OUTPUT PORT | PROCESSING PART ON OUTPUT STAGE |
|---|---|---|
| INPUT DEVICE | IMAGE INPUT | MOVING OBJECT DETECTION, FACE RECOGNITION |
| MOVING OBJECT DETECTION | 2: DATA OUTPUT (PRESENCE OR ABSENCE OF MOVEMENT) | SOUND BUZZER |
| FACE RECOGNITION | 2: DATA OUTPUT (NAME OF PERSON) | STORING INTO DB |

FIG.12

EXAMPLE OF OUTPUT TABLE 

| No. | PROCESSING PART | OUTPUT PORT | SENSITIVE INFORMATION TYPE | |  |
|---|---|---|---|---|---|
| | | | FACE INFORMATION | CAR NUMBER INFORMATION | ... |
| 1 | INPUT DEVICE | IMAGE OUTPUT | YES | YES | ... |
| 2 | MOVING OBJECT DETECTION | 1: IMAGE OUTPUT | YES | YES | ... |
| 3 | MOVING OBJECT DETECTION | 2: DATA OUTPUT (PRESENCE OR ABSENCE OF MOVEMENT) | NO | NO | ... |
| 4 | FACE RECOGNITION | 1: IMAGE OUTPUT | YES | YES | ... |
| 5 | FACE RECOGNITION | 2: DATA OUTPUT (NAME OF PERSON) | YES | NO | ... |
| 6 | FACE RECOGNITION | 3: DATA OUTPUT (SUCCEED IN RECOGNITION OR NOT) | NO | NO | ... |

FIG.13

EXAMPLE OF REQUIREMENT TABLE  11g

| No. | PROCESSING PART | INPUT PORT | SENSITIVE INFORMATION TYPE | | |
|---|---|---|---|---|---|
| | | | FACE INFORMATION | CAR NUMBER INFORMATION | ... |
| 1 | MOVING OBJECT DETECTION | IMAGE INPUT | NOT REQUIRED | NOT REQUIRED | ... |
| 2 | FACE RECOGNITION | IMAGE INPUT | REQUIRED | NOT REQUIRED | ... |
| 3 | SOUND BUZZER | DATA INPUT | NOT REQUIRED | NOT REQUIRED | ... |
| 4 | STORING INTO DB | DATA INPUT | NOT REQUIRED | NOT REQUIRED | ... |

NON-TRANSITORY COMPUTER-READABLE RECORDING MEDIUM HAVING STORED THEREIN INFORMATION PROCESSING PROGRAM, INFORMATION PROCESSING METHOD, AND INFORMATION PROCESSING APPARATUS

CROSS-REFERENCE TO RELATED APPLICATION

This application is based upon and claims the benefit of priority of the prior Japanese Patent application No. 2020-008176, filed on Jan. 22, 2020, the entire contents of which are incorporated herein by reference.

FIELD

The embodiment(s) discussed herein is(are) related to a non-transitory computer-readable recording medium having stored therein an information processing program, an information processing method, and an information processing apparatus.

BACKGROUND

With the enhancement in performance of devices such as sensors and cameras and in speed of networks, services using multimedia data such as moving images and still images tend to increase.

As a development base that aids development and execution of a program such as an application that provides such a service, a data processing service using flow-based programming (Flow-Based Programming) (hereinafter referred to as "FBP") has been known.

The FBP is an example of Dataflow Programming. The FBP is a tool that achieves the development of a program by combining the processing parts on a Graphical User Interface (GUI). Each "processing part" is a functional block defined so as to perform "processing" such as acquiring, processing, detecting, or analyzing of data, and is an example of a "module".

Using the FBP, a developer of a program (service) can develop program easily or quickly, even if not familiar with the processing parts and coding.

[Patent Document 1] Japanese Laid-open Patent Publication No. 2017-188771
[Patent Document 2] Japanese Laid-open Patent Publication No. 2019-98575
(Patent Document 3] Japanese Laid-open Patent Publication No. 2018-72957

Data that is to be handled (processed) in a program created by means of FBP may include sensitive information. "Sensitive information" is information to be considered, and is an example of personally identifiable information.

SUMMARY

According to an aspect of the embodiment, a non-transitory computer-readable recording medium having stored therein an information processing program that causes a computer to execute a process including: extracting second data through executing a first process on first data including sensitive information; outputting fourth data obtained by executing the first process on third data, the third data being obtained by executing a second process to delete sensitive information on the first data; and determining, based on a result of comparing the second data with the fourth data, whether or not the first process uses sensitive information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 10 is a diagram illustrating an example of processing part information;
FIG. 11 is a diagram illustrating an example of graph information;
FIG. 12 is a diagram illustrating an example of an output table;
FIG. 13 is a diagram illustrating an example of a requirement table.

DESCRIPTION OF EMBODIMENT(S)

Figure 1:
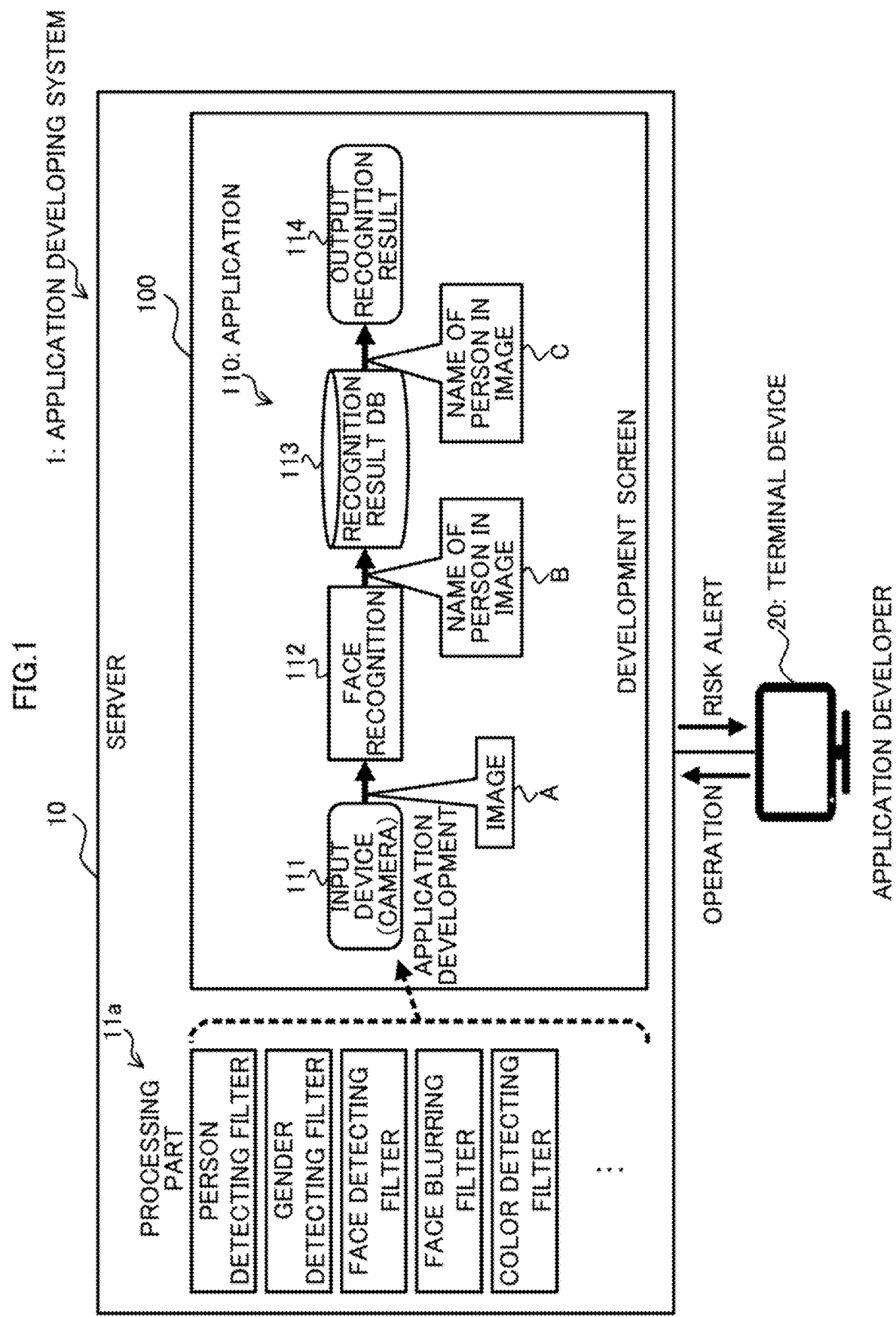
FIG. 1 is a diagram illustrating an application developing system according to one embodiment.

When sensitive information is to be processed, appropriate measures, such as prior consent confirmation of the owner of the personally identifiable information and storage under restriction of a time period and a place, are required. If these measures have not been taken, security risks will increase, which may cause violations or administrative guidance and may be damaging to the business.

A developer of a program needs to determine whether or not sensitive information included in the data to be processed by program and take conscious measures. However, the presence or the absence of sensitive information in the data may vary with execution environment of the program (service). In addition, some combination of data and processes may generate or remove sensitive information.

For the above, it is difficult to appropriately grasp the range in which the sensitive information is transferred between the processing parts. Therefore, there is a risk that an appropriately measure is not made for sensitive information due to oversight of the sensitive information by the developer. In particular, if a developer who is not familiar with the processing part is to develop a program, the risk may be increased.

Hereinafter, an embodiment of the present invention will now be described with reference to the accompanying drawings. However, one embodiment described below is merely illustrative and the present embodiment can be variously modified and implemented without departing from the scope thereof. In the drawings to be used in the following description, the same reference numbers denote the same or similar parts, unless otherwise specified.

(1) One Embodiment (1-1) Explanation of One Embodiment

FIG. 1 is a diagram illustrating an application developing system 1 according to one embodiment. As illustrated in FIG. 1, the application developing system 1 may illustratively include a server 10 and a terminal device 20. In the example of FIG. 1, the application developing system 1 includes one terminal device 20, but may alternatively include two or more terminal devices 20.

The application developing system 1 is a system to develop a program such as an application, in other words, service, and is an example of an information processing system.

The terminal device 20 is an example of an information processing terminal operated by a developer of a program such as an application. For example, the terminal device 20 is connected to the server 10 through a non-illustrated network, and operates a development screen 100 provided by the server 10 and display a risk alert that the server 10 sends, using an application such as a web browser.

Examples of the terminal device 20 are various computers such as a Personal Computer (PC) and a server.

The server 10 is a server that provides development environment to develop and execute a program such as an application, and is an example of an information processing apparatus or a computer. The server 10 may provide, as such a development environment, data processing service using FBP of the terminal device 20, for example.

For example, the server 10 may be a virtual server (Virtual Machine (VM)) or a physical server. The function of the server 10 may be achieved by a single computer or two or more computers. Furthermore, at least part of the function of the server 10 may be achieved by using hardware (HW) resource and network (NW) resource provided in cloud environment.

The server 10 may be connected to another apparatus, for example, one or more terminal devices 20, through the network so as to be communicable to each other. Examples of the network may include a Wide Area Network (WAN), a Local Area Network (LAN), and the combination thereof. The WAN may include Internet and the LAN may include a Virtual Private Network (VPN).

As illustrated in FIG. 1, the server 10 may illustratively store and manage multiple processing parts 11a. The server 10 may aid development and execution of an application 110 by combining selected processing parts 11a in accordance with operation (e.g., operation on the GUI) by the terminal device 20.

Each processing part 11a may be used as a functional block (functional unit) having peculiar (particular) function on the data processing service that the server 10 provides. A processing part 11a has one of or both an input port through which data (information) is input and an output port through which data (information) is output, and is an example of a module that executes predetermined processing on data. A processing part 11a may also be referred to as a "node", a "functional block", and an "object".

As illustrated in FIG. 1, examples of the processing parts 11a are various filters of a person detecting filter, a gender detecting filter, a face detecting filter, a face blurring filter, and a color detecting filter. Another example of the processing parts 11a is various processes or functions such as face recognition as illustrated in FIG. 1. Further additional example of the processing part 11a are various apparatus and processes such as an input device (camera), a recognition result Database (DB), an output recognition result.

The server 10 develops an application 110 that executes predetermined processing by arranging and connecting a processing parts 11a on the development screen 100 in response to an operation from the terminal device 20 that the developer makes. The development screen 100 may be displayed on the display region of the web browser of the terminal device 20. The web browser may be displayed on an output device, such as a monitor, of the terminal device 20.

In the example of FIG. 1, the server 10 generates an application 110 that cascades processing parts 11a in sequence of an input device 111 such as a camera, a face recognition 112, a recognition result DB 113, and an output-recognition-result 114.

In the application 110, sensitive information may be included in one of or both the input and the output of each processing part 11a. An example of including sensitive information is at least one or more of an output from the processing part 11a serving as a starting element, one of or both an input and an output of the processing part 11a serving as an intermediate element, and the input of the processing part 11a serving as end element. In the example of FIG. 1, an image A can be included in the output of the input device 111 and the input of the face recognition 112; a name B of the person in the image can be included in the output of the face recognition 112 and the input of the recognition result DB 113; and furthermore, a name C of the person in the image can be included in the inputs of the recognition result DB 113 and also the output-recognition-result 114.

The server 10 of one embodiment makes a risk alert related to the processing part 11a and the sensitive information in the development of the application 110. Hereinafter, description will now be made in relation to an example of outputting a risk alert by the server 10 of one embodiment.

Figure 2:
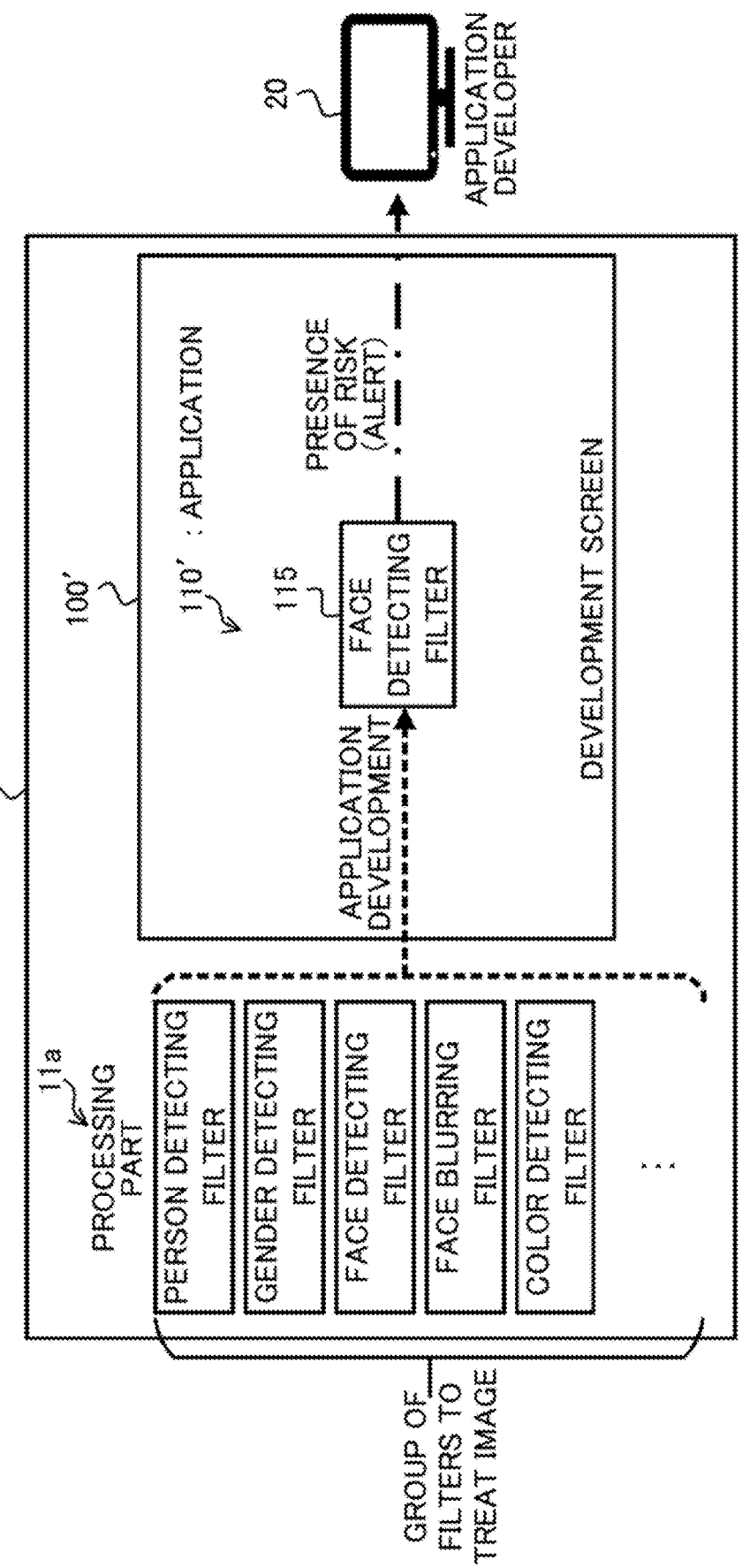
FIG. 2 is a diagram illustrating a comparative example of display of a risk alert.

First of all, description will now be made in relation to a comparative example of a risk alert. FIG. 2 is a diagram illustrating a comparative example of displaying a risk alert.

The server 10' according to the comparative example determines that an image (moving image or still image) always includes information having a high sensitivity degree. Information having a high sensitivity degree is exemplified by sensitive information such as a face of a person or a car number.

As illustrated in FIG. 2, a case where the developer uses one, e.g., the face detecting filter 115, of the filters that deal with an image among processing parts 11a on the development screen 100' is assumed. In this case, the server 10' determines that an application 110' that is developed by using the face recognition filter 115 has a risk and displays (exhibits) an alert indicating that the application 110' includes a risk on the development screen 100'.

However, the server 10' may sometimes be incapable of correctly determining the risk included in the image. For example, in cases where a processing part 11a that reduces the risk, such as a face blurring filter, is used in the development screen 100', the output does not include sensitive information (because being removed), but the server 10' determines that the image includes a risk since the image serves as the input.

In the above manner, when the server 10' uniformly determines the presence or the absence of a risk on the basis of whether or not the processing part 11a deals with an image in the development stage of the application 110' that uses data that can include sensitive information such as an image as an input, there is a possibility that risk determination is unable to correctly made in advance.

For example, an image obtained by a monitoring camera disposed in, for example, a shopping street can include a large number of faces of persons as sensitive information. An image obtained by a fixed-point camera disposed on, for example, a highway does not include faces of persons but can include cars (e.g., car number) as sensitive information. Furthermore, an image including a doorplate and location information may include address information as sensitive information. In contrast, in cases where a camera image is combined with a motion detecting filter, an output of the motion detecting filter can include a result of motion detection (e.g., the presence or the absence of motion) but sometimes does not include sensitive information.

As described above, there is a possibility that an image may include various type of sensitive information, but it is difficult to determine in advance which type of sensitive information is included in an actual image. Consequently, it is difficult to grasp in advance a risk related to an image at the development stage of the application 110'.

As a solution to the above, the server 10 of one embodiment provides a scheme that facilitates risk determination related to sensitive information at the development stage of the application 110 by one or a combination of two or more of the following schemes (a)-(c).

(a) The server 10 detects whether or not data output as a result of a process includes sensitive information. For example, the server 10 may carry out the following processes (a-1) and (a-2).

(a-1) The server 10 extracts second data by executing a first process on first data including sensitive information.

(a-2) The server 10 determines whether or not the second data includes sensitive information on the basis of a result of executing a second process on the second data by a module that is stored in association with sensitive information and also that executes the second process to determine whether or not the sensitive information is included.

In the above scheme (a), the process (first process) may be a process performed by a processing part 11a.

Figure 3:
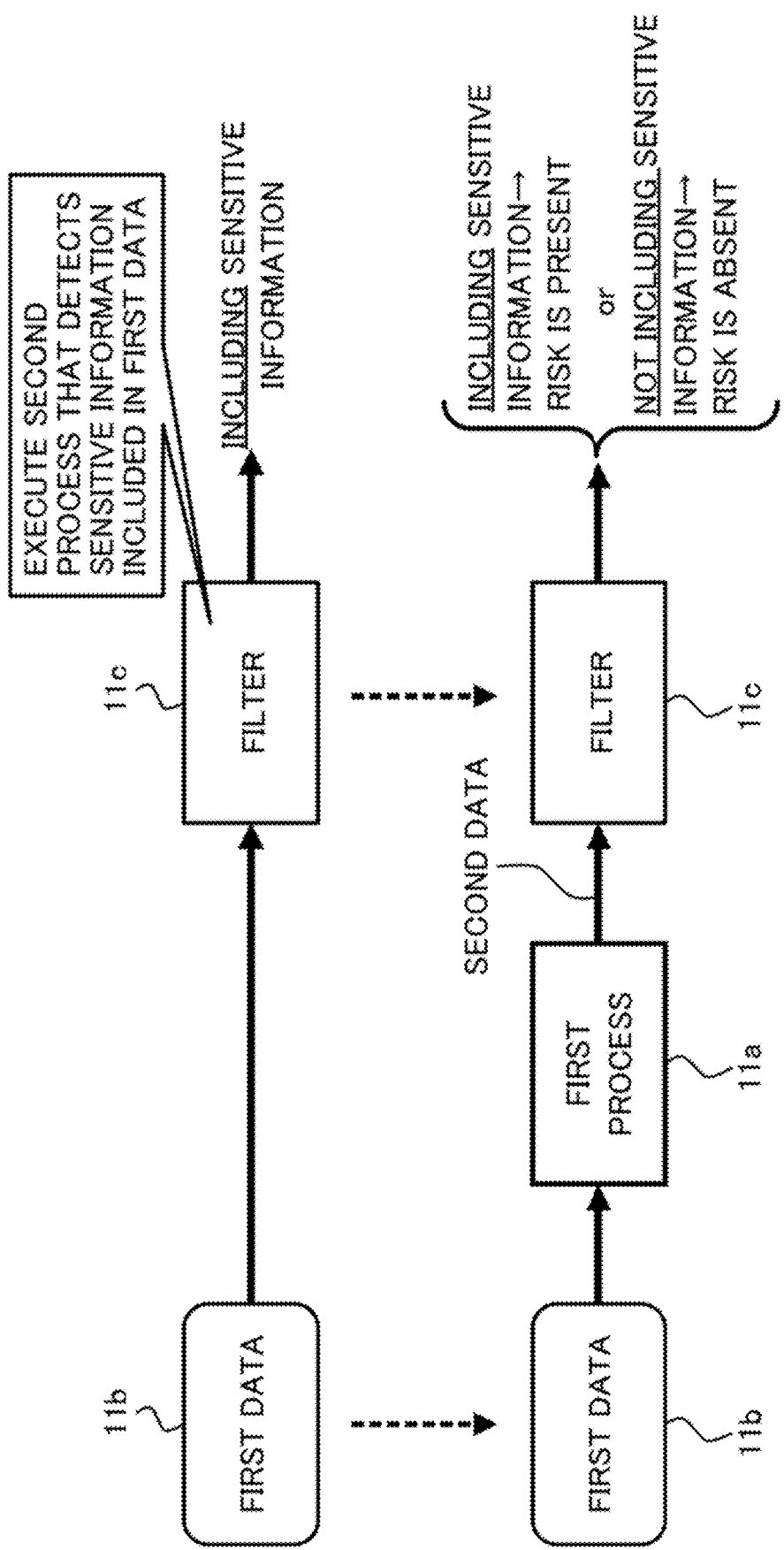
FIG. 3 is a diagram illustrating an example of a first scheme that facilitates risk determination of sensitive information.

FIG. 3 is a diagram illustrating an example of the above scheme (a). As illustrated in FIG. 3, a filter 11c is an example of a module that is stored in association with the sensitive information included in first data 11b and also that executes the second process to determine whether or not the sensitive information is included. As an example, the first data 11b is a sample image including a face of a person serving as sensitive information, and the filter 11c may be a face detecting filter that executes a second process that outputs a detection result (e.g., whether a face is detected or not) of detecting a face from input data. The server 10 may store a combination (set) of the first data 11b and the filter 11c in association with each other in advance.

As illustrated on the upper row of FIG. 3, when the first data 11b is input into the filer 11c, the filter 11c outputs information exhibiting that the sensitive information is included (e.g., a face is detected).

In the above scheme (a), as illustrated in a lower row of FIG. 3, the server 10 inputs the first data 11b into the first process, e.g., the processing part 11a, and extracts second data, which is an output (processing result) from the first process and inputs the second data into the filter 11c.

For example, in cases where the filter 11c outputs information indicating that sensitive information is included, the processing part 11a outputs second data that includes the sensitive information as it is, which means that the processing part 11a has a risk related to the sensitive information.

In contrast, in cases where the filter 11c outputs information indicating that sensitive information is not included, the processing part 11a outputs second information from which sensitive information is erased (deleted), which means that the processing part 11a has no risk related to the sensitive information.

In the above manner, the server 10 detects whether the second data output through the first process includes the sensitive information, using the first data 11b prepared in advance and the filter 11c that detects the sensitive information.

As described above, the server 10 can precisely detect whether or not data (second data) output through a process (first process) includes sensitive information in the above scheme (a).

The server 10 may execute the detection in the above scheme (a) for each processing part 11a each time a processing part 11a is registered into the server 10.

Figure 4:
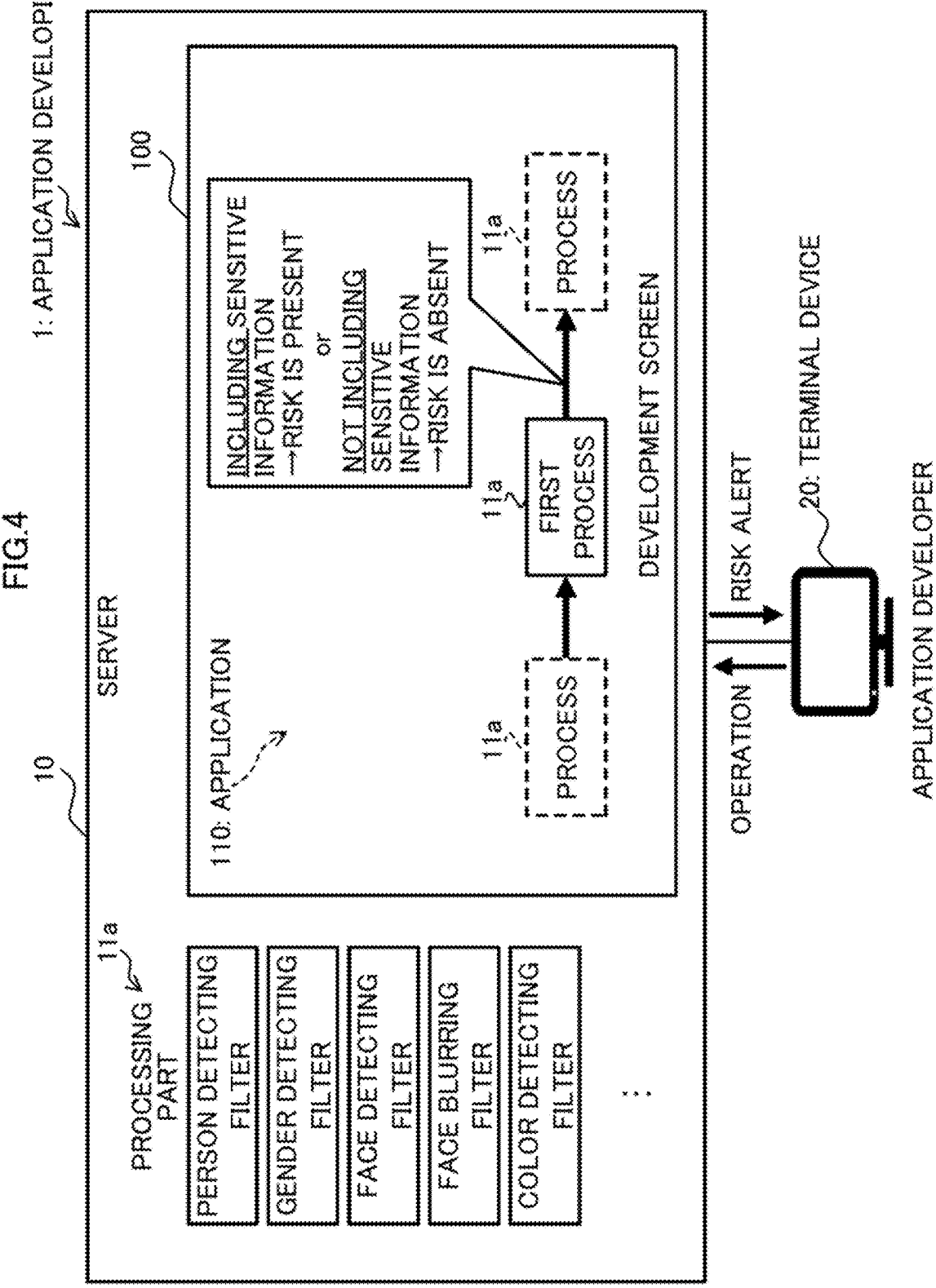
FIG. 4 is a diagram illustrating an example of displaying a processing result in the first scheme.

The server 10 may display the result (processing result of the scheme (a)) of determining whether or not the sensitive information is included in the second data on, for example, the development screen 100, as illustrated in FIG. 4. For example, the determination result may be displayed so as to discriminate whether or not sensitive information is included in the data output from the processing part 11*a* in at least one display style of, for example, a letter string, illustration, an image, and a type (e.g., color, line type and/or line width) of a line connected to the processing part 11*a*. The determination result may be displayed on the development screen 100, which displays a combination of multiple processing parts 11*a* including the processing part 11*a* to be displayed (e.g., application 110) as illustrated in the example of FIG. 4, or on a development screen 100 that displays a single processing part 11*a*. In cases where the determination result is information indicating that sensitive information is included (the risk is present), displaying of the information on the development screen 100 is an example of displaying a risk alert (alert).

(b) The server 10 determines whether the process uses sensitive information. For example, the server 10 may execute the following processes (b-1) to (b-3).

(b-1) The server 10 extracts second data by executing first process on a first data including sensitive information.

(b-2) The server 10 executes the first process on third data having undergone a second process to delete the sensitive information from the first data and outputs fourth data obtained through the second process.

(b-3) The server 10 determines, on the basis of a result of comparing the second data with the fourth data, whether or not the first process is a process that uses sensitive information.

In the above scheme (b), the process (first process) may be a process performed by the processing part 11*a*.

Figure 5:
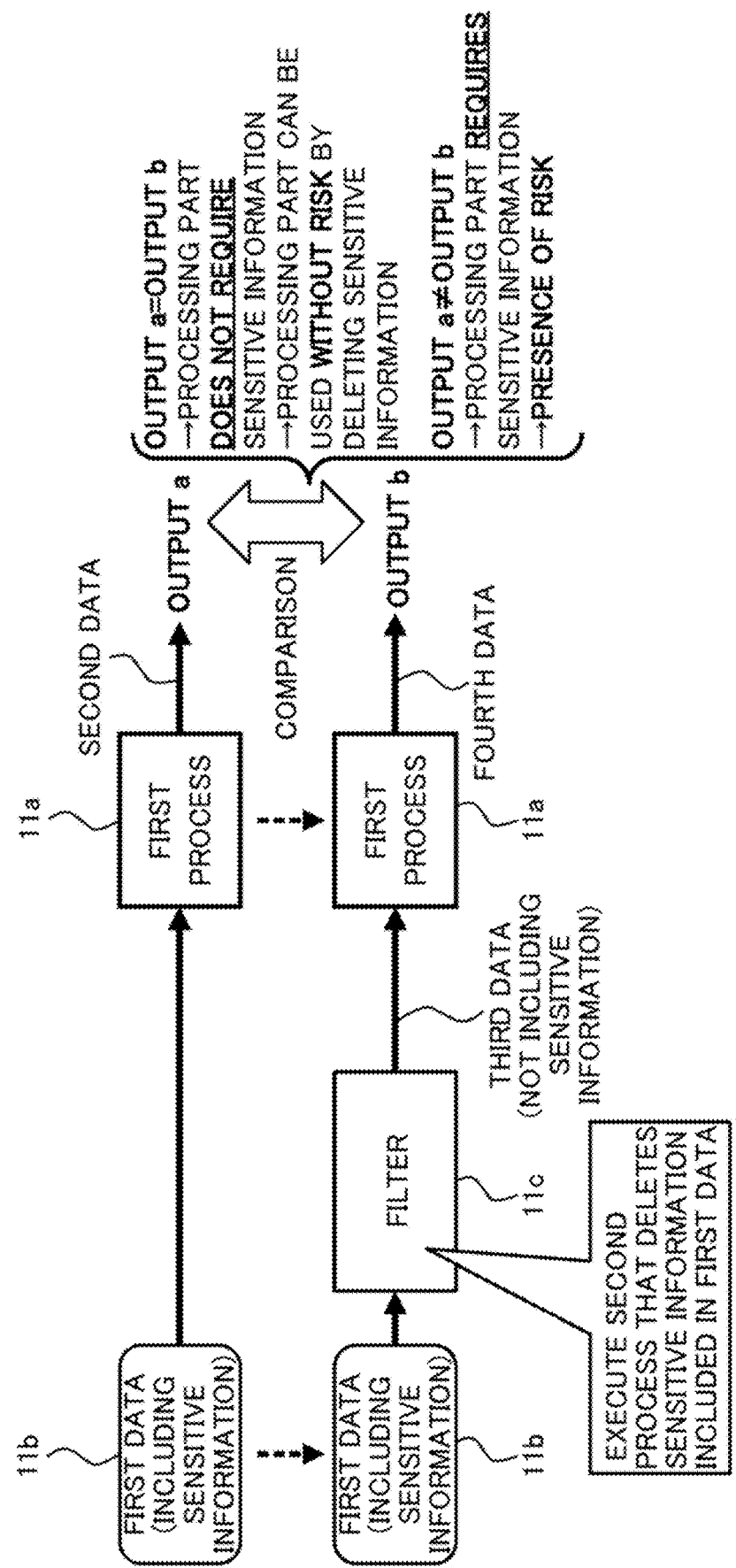
FIG. 5 is a diagram illustrating an example of a second scheme that facilitates risk determination of sensitive information.

FIG. 5 is a diagram illustrating an example of the above scheme (b). As illustrated in FIG. 5, the filter 11*c* is an example of a module that executes the second process to delete the sensitive information included in the first data 11*b*. As an example, the first data 11*b* may be a sample image including, as the sensitive information, an image of a face of a person, and the filter 11*c* may be a face blurring filter that outputs data obtained by blurring the face in the image included in the input data. The server 10 may store a combination (set) of the first data 11*b* and the filter 11*c* in association with each other in advance.

In the above scheme (b), as illustrated in the upper row of FIG. 5, the server 10 inputs the first data 11*b* into the first process, e.g., a processing part 11*a*, and extracts second data ("output a" in the example of FIG. 5) from the output (processing result) from the first process.

Furthermore, as illustrated in the lower row of FIG. 5, the server 10 inputs the first data 11*b* into the second process, e.g., the filter 11*c*. Then the server 10 inputs the third data that is output from the second process and from which the sensitive information is erased into the first process, and extracts fourth data (in the example 5, "output b"), which is an output from the first process.

As illustrated in FIG. 5, the server 10 compares an output a from the first process into which the first data including sensitive information is input with an output b from the first process into which third data not including sensitive information is input. Then the server 10 determines whether or not the first process is a process that uses sensitive information, on the basis of the result of the comparison.

For example, in cases where the output a is the same as (matches) the output b, the processing part 11*a* outputs the same processing result irrespective of the presence or the absence of the sensitive information. In other words, since the processing part 11*a* does not use sensitive information (i.e., the sensitive information is not required), the server 110 can operate, by connecting a module, e.g. the filter 11*c*, that executes the second process on the input side of the processing part 11*a*. In this case, it can be said that the processing part 11*a* does not have a risk related to the sensitive information.

In contrast, in cases where the output a is different from (dose not match) the output b, the processing part 11*a* outputs a processing result different with the presence or the absence of the sensitive information. In other words, since the processing part 11*a* uses (requires) the sensitive information, the processing part 11*a* has a risk related to the sensitive information.

In the above manner, the server 10 determines whether or not the first process uses sensitive information on the basis of the result of comparing outputs of the first process in cases where sensitive information is included or not included using the first data 11*b* prepared in advance and the filter 11*c* that deletes the sensitive information.

As the above, the server 10 can precisely determine whether or not a process (first process) uses the sensitive information in the above scheme (b).

The server 10 may execute the detection of the above scheme (b) for each processing part 11*a* each time a processing part 11*a* is registered into the server 10.

The output a and the output b both may be information indicating a processing result of, for example, determination or detection of the output data except for data image. In other words, the first process in the above scheme (b) may be a processing part 11*a* that outputs information representing at least a processing result of, for example, determination or detection. Alternatively, the processing part 11*a* may output output data of an image from an output port different from one that outputs the output a or the output b.

Figure 6:
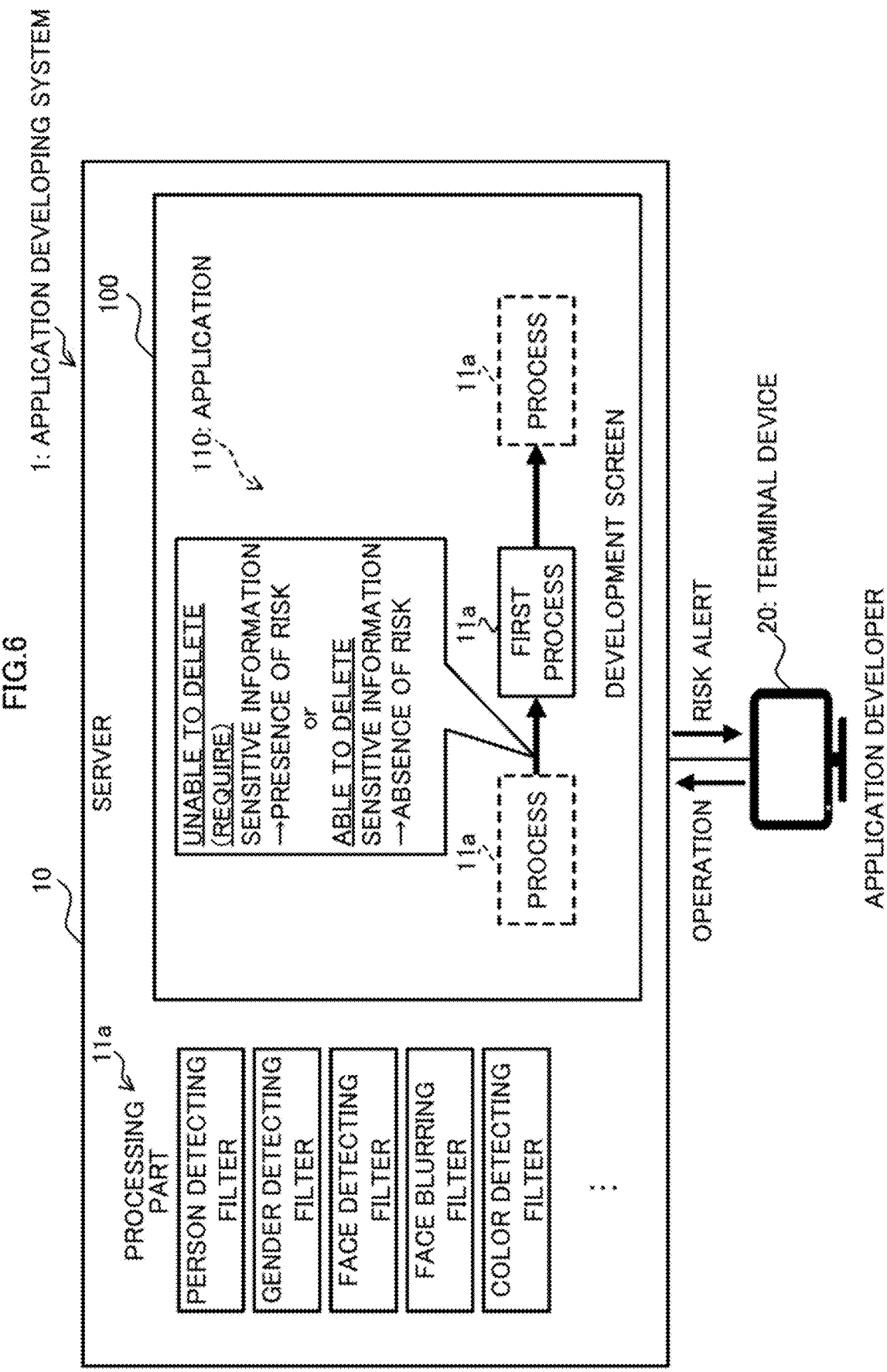
FIG. 6 is a diagram illustrating an example of displaying a processing result in the second scheme.

Furthermore, as illustrated in FIG. 6 for example, the server 10 may display a determination result (processing result of the scheme (b)) whether or not the first process uses the sensitive information on the development screen 100 or the like. For example, the determination result may be displayed so as to discriminate whether or not sensitive information is required in at least one display styles of, for example, a letter string, illustration, an image, and a type (e.g., color, line type and/or line width) of a line connected to the processing part 11*a*. The determination result may be displayed on the development screen 100, which displays a combination of multiple processing parts 11*a* including the processing part 11*a* to be displayed (e.g., application 110) as illustrated in the example of FIG. 6, or on a development screen 100 that displays a single processing part 11*a*. In cases where the result of determination is information indicating that sensitive information is unable to delete (i.e., the sensitive information is required), that is, information representing the presence of a risk, displaying of the information on the development screen 100 is an example of displaying a risk alert (alert).

Figure 7:
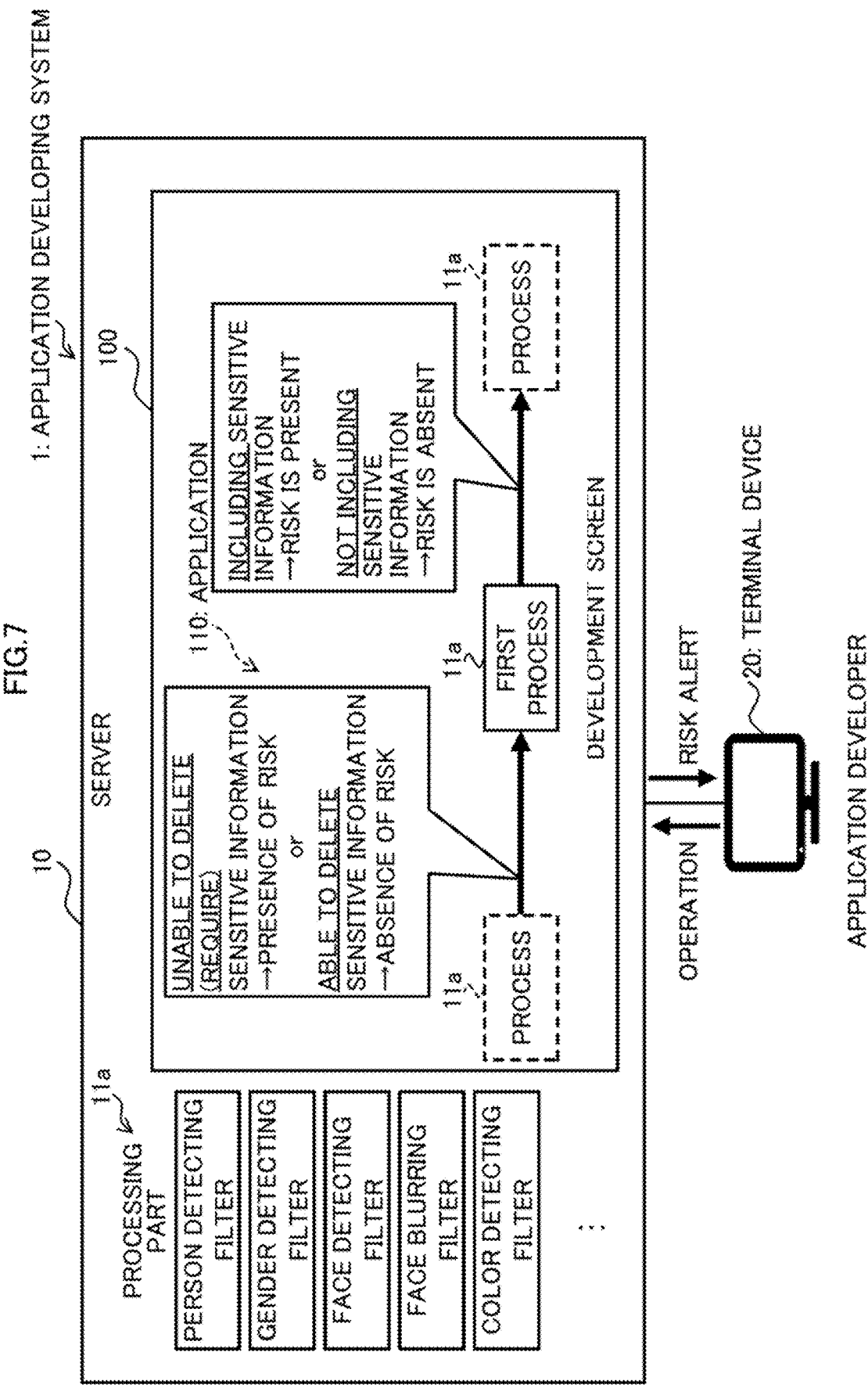
FIG. 7 is a diagram illustrating an example of displaying processing results in the first and second schemes.

In cases where the above scheme (a) and scheme (b) are executed in combination with each other, the above scheme (a) and scheme (b) may be sequentially performed on a certain processing part 11*a*. Either the scheme (a) or scheme (b) may be performed precedently. In this case, as illustrated in FIG. 7, the server 10 may collectively display determination results in above scheme (a) and scheme (b) on the development screen 100, or, as illustrated in FIGS. 4 and 6, may separately display determination results in above scheme (a) and scheme (b) on the development screen 100.

(c) The server 10 visualizes a flow of data including the sensitive information. For example, the server 10 may execute the following process.

In cases where multiple icons representing information related to devices or processes are displayed on the screen in association with one another, the server 10 changes the display style of the association between icons in accordance with whether or not data transferred between devices or processes identified by the associated multiple icons includes the sensitive information.

For example, the server 10 may determine generation or removal of the sensitive information by each of the multiple processing parts 11*a* (devices or processes). Then, in cases where icons of multiple processing parts 11*a* are associated with (e.g., connected to) one another and output onto the development screen 100 as an application 110, the server 10 may estimate a range where sensitive information is transferred and highlight the estimated range on the development screen 100.

Figure 8:
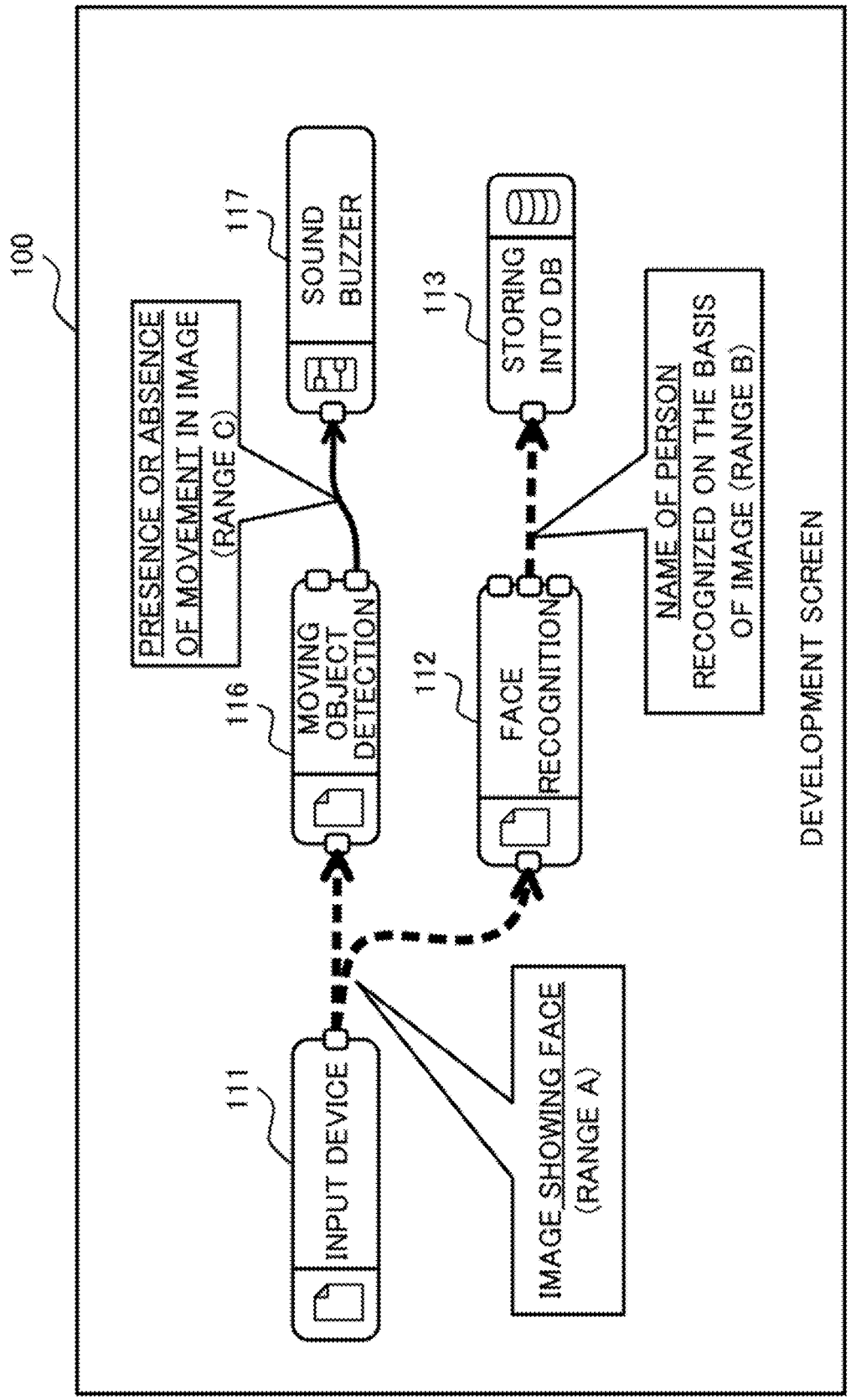
FIG. 8 is a diagram illustrating an example of a third scheme that facilitates risk determination on sensitive information.

FIG. 8 is a diagram illustrating an example of the above scheme (c). As illustrated in FIG. 8, information related to a device in the above scheme (c) may be a processing part 11*a* related to a device exemplified by the input device 111, the recognition result DB 113 (storing-into-DB), and sound-buzzer 117. Example of the information related to a process may be a processing part 11*a* related to a process or a function exemplified by various filters, face recognition 112, moving object detection 116. Further, the screen may be a development screen 100 that displays a state where the multiple processing parts 11*a* are arranged and connected to one another.

For example, in cases where the input device 111 such as a camera outputs image data including a face of a person, the server 10 estimates a range where sensitive information is transferred among processing parts 11*a* on the basis of the result of determining generation or removal of sensitive information of each processing part 11*a* in the following manner.

Between an output of the input device 111 and an input of each of the moving object detection 116 and the face recognition 112 (in a range A), an image showing a face corresponding to the sensitive information is transferred.

Between the output of the face recognition 112 and the input of the recognition result DB 113 (storing-into-DB) (in range B), the name of the person recognized on the basis of the image corresponding to the sensitive information is transferred.

Between the moving object detection 116 and the sound-buzzer 117 (in range C), the presence or the absence of motion in the image not corresponding to the sensitive information is transferred.

Accordingly, the server 10 changes the display style of the association between the icons in the range A and the range B in which the sensitive information is transferred on the development screen 100. As an example, the server 10 may change the color of the connecting line between the icons. In the example of FIG. 8, the connecting lines (a broken lines in FIG. 8) in the range A and range B among the connecting lines between icons are red, and the connecting line (a solid line in FIG. 8) of the range C is black or gray.

Visually exhibiting information of the processing part 11*a* having a risk related to sensitive information on the development screen 100 as the above makes the developer possible to easily determine the risk of each processing part 11*a* in a development stage of the application 110.

As the above, the server 10 can visualize a flow of data including the sensitive information in the above scheme (c).

Changing the display style of the association between icons may include, for example, a change one of or both the line type and the line width of the connecting line that connects the icons in accordance with whether or not sensitive information is included in place of or in addition to changing the color of the connecting line.

For determination as to whether data transferred among multiple devices or processes identified by multiple icons associated with one another in the above scheme (c) includes sensitive information, one of or both the processing results of the above scheme (a) or scheme (b) may be used. Otherwise, for the determination, a processing result of a process that determines whether or not the data obtained by a scheme different from the above scheme (a) or scheme (b) includes the sensitive information.

Combining one of or both the above scheme (a) and scheme (b) with the above scheme (c) can be regarded as one embodiment (example) of examples (FIGS. 4, 6, and 7) that displays the processing result of one of or both the above scheme (a) and scheme (b) on, for example, development screen 100.

As described above, the server 10 can provide, in terms of at least one the above schemes (a) to (c), development environment that facilitates the risk determination related to the sensitive information at the development stage of the application 110.

Figure 9:
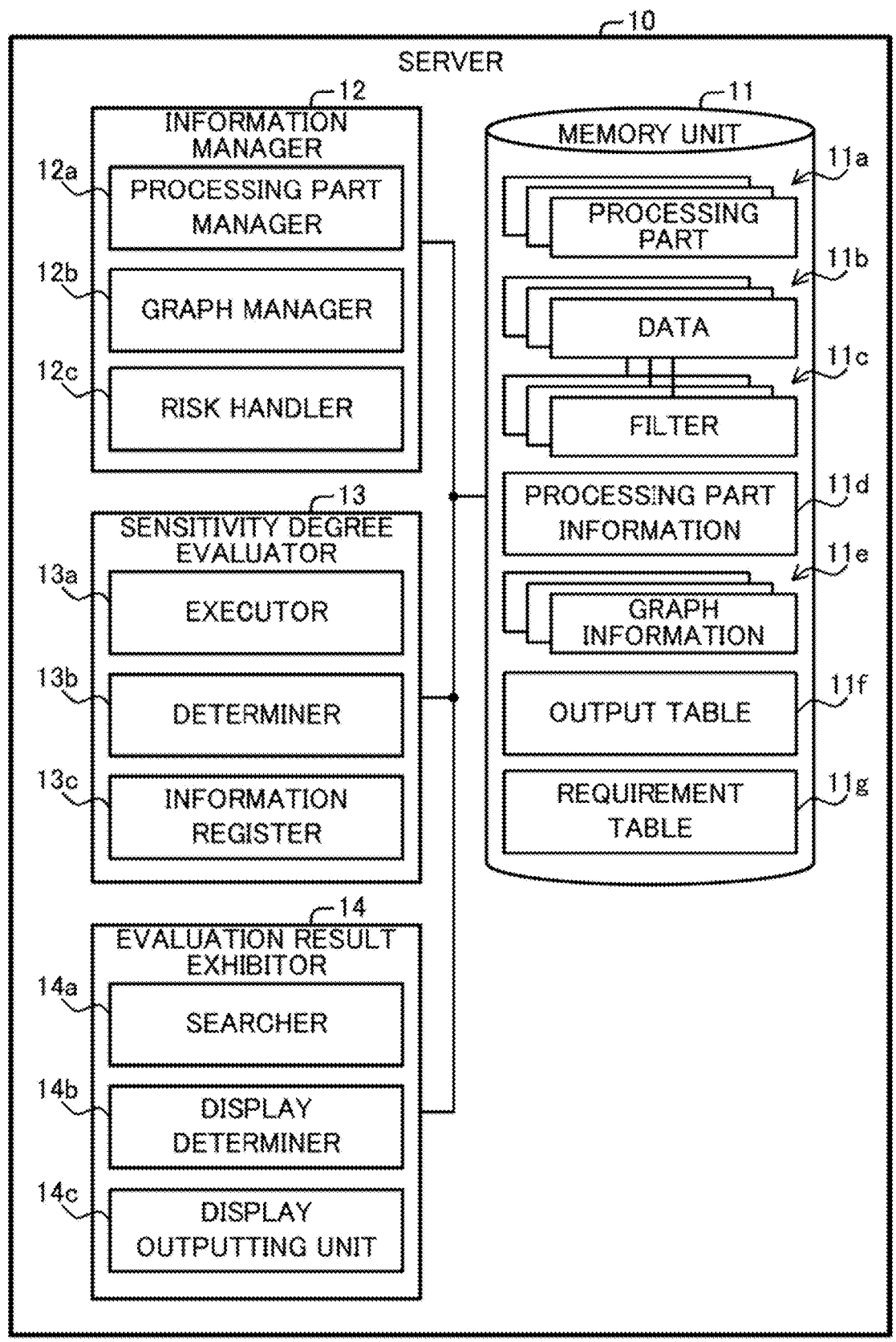
FIG. 9 is a block diagram schematically illustrating an example of a functional configuration of a server according to one embodiment.

(1-2) Example of Functional Configuration of Server:

Next, description will now be made in relation to the server 10 according to one embodiment with reference to FIG. 9. FIG. 9 is a block diagram schematically illustrating an example of a functional configuration of the server 10 according to one embodiment.

As illustrated in FIG. 9, the server 10 may exemplarily include a memory unit 11, an information manager 12, a sensitivity degree evaluator 13, and an evaluation result exhibitor 14.

The memory unit 11 is an example of a storing region and stores various pieces of information used for executing data processing service serving as development base. As illustrated in FIG. 9, the memory unit 11 exemplarily stores multiple processing parts 11*a*, multiple pieces of data 11*b*, multiple filters 11*c*, processing part information 11*d*, multiple pieces of graph information 11*e*, an output table 11*f*, and a requirement table 11*g*.

In the following explanation, the processing part information 11*d*, the multiple pieces of graph information 11*e*, the output table 11*f*, and the requirement table 11*g* are each exhibited in the table form, but form of these pieces of information are not limited to these. The data form of these pieces of information may be various forms exemplified by a DB or a sequence.

A processing part 11*a* is an example of a module registered in the development base. The data 11*b* may be sample data including sensitive information. For example, the data 11*b* may be stored in the memory unit 11 for each of the types of sensitive information such as face of person and car number. The filters 11*c* may be a filter associated with the data 11*b* and may be ones that can detect and remove sensitive information included in the data 11*b*. The filter 11*c* may be one of a processing part 11*a* or a combination of two or more processing part 11*a*.

The information manager 12 manages the processing part information 11*d* and the graph information 11*e* in accordance with operation that the terminal device 20 used by the developer of the processing part 11*a* makes on the development screen 100. The information manager 12 may exemplarily include a processing part manager 12a, a graph manager 12b, and a risk handler 12c.

The processing part manager 12a manages a processing part 11a registered in the development base. For example, when a processing part 11a is to be registered (e.g., stored) in the server 10 (e.g., memory unit 11), the processing part manager 12a stores the processing part 11a into the memory unit 11 and also generates or updates the processing part information 11d.

FIG. 10 is a diagram illustrating an example of processing part information 11d. As illustrated in FIG. 10, the processing part information 11d may include items of "ID", "PROCESSING PART", "INPUT PORT", AND "OUTPUT PORT".

The item "ID" is an example of the identification information of a processing part 11a. In the item "PROCESSING PART", the name of the processing part 11a may be set as information to identify the processing part 11a, for example. In the item "INPUT PORT", one of or both the ID and the name of a port may be set as information to identify the port on the input side (upstream of the flow) of the processing part 11a, for example. In the item "OUTPUT PORT", one of or both the ID and the name of a port may be set as information to identify the port on the output side (downstream of the flow) of the processing part 11a, for example. No information may be set in the item "INPUT PORT" of a processing part 11a that is the starting point of a graph such as the input device 111 and also in the item "OUTPUT PORT" of a processing part 11a that is the end point of a graph such as the sound-buzzer 117 or the recognition result DB 113 (storing-into-DB).

As illustrated in FIG. 1, the graph manager 12b associates (e.g., connects), as an application 110, multiple processing parts 11a in accordance with the operation that the terminal device 20 makes on the development screen 100, and stores the association, as the graph information 11e, into the memory unit 11.

FIG. 11 is a diagram illustrating an example of the graph information 11e. The graph information 11e is information that defines a graph, which means a flow representing a flow of data. The graph manager 12b may manage the graph information 11e for each graph that the terminal device 20 generates or updates.

As illustrated in FIG. 11, the graph information 11e may include items of "PROCESSING PART", "OUTPUT PORT", and "PROCESSING PART ON OUTPUT SIDE". In the item "PROCESSING PART", one of or both the ID and the name of the processing part 11a (see FIG. 10) included in the graph may be set. The entries may be registered in the sequence from the "PROCESSING PART" positioning at the starting point of the graph to the "PROCESSING PART" positioning at the end point of the graph in the graph information 11e.

In the item "OUTPUT PORT", information to identify an output port connected to the "PROCESSING PART ON OUTPUT SIDE" among the output ports (see FIG. 10) of the "PROCESSING UNIT", e.g., one of or both the ID and the name of the port, may be set. In the item "PROCESSING PART ON OUTPUT SIDE", one of or both the ID and the name of the processing part 11a connected to the "PROCESSING PART" may be set.

In cases where a processing part 11a that the sensitivity degree evaluator 13 has determined not to use sensitive information is to be arranged on the development screen 100, the risk handler 12c carries out a process to reduce (e.g., eliminate) the risk related to the sensitive information of the processing part 11a. For example, the risk handler 12c may be place a filter 11c to delete sensitive information at the input side of the processing part 11a. The risk handler 12c will be detailed below.

The sensitivity degree evaluator 13 evaluates a sensitivity degree including one or both whether the processing part 11a outputs sensitive information and whether the processing part 11a uses sensitive information in one of or both the above scheme (a) and scheme (b). For example, when a processing part 11a is to be stored into the memory unit 11 by the processing part manager 12a, the sensitivity degree evaluator 13 may evaluate the sensitivity degree, regarding the processing part 11a as the target of evaluation. The sensitivity degree evaluator 13 exemplarily includes an executor 13a, a determiner 13b, and the information register 13c.

Using the data 11b and the filer 11c, the executor 13a executes one of or both the above scheme (a) and scheme (b) on the processing part 11a of the target of the evaluation and thereby obtains data to be used for evaluation.

The determiner 13b valuates the sensitivity degree of the processing part 11a of the target of evaluation, using data that the executor 13a obtains.

On the basis of the result of determination (evaluation result) by the determiner 13b, the information register 13c generates or updates one of or both the output table 11f and the requirement table 11g.

FIG. 12 is a diagram illustrating an example of the output table 11f. As illustrated in FIG. 12, the output table 11f may include items of "No.", "PROCESSING PART", "OUTPUT PORT", and "SENSITIVE INFORMATION TYPE". In the output table 11f, entries are registered for each "PROCESSING PART" and also for each "OUTPUT PORT" so that past evaluation results may be accumulated.

The item "No." is identification information of an entry in the output table 11f. In the item "PROCESSING PART", one of or both the ID and the name of the processing part 11a of a target of evaluation may be set. In the item "OUTPUT PORT", one of or both the ID and the name of an output port may be set.

In the item "SENSITIVE INFORMATION TYPE", an evaluation result may be set for each type of a sensitivity degree serving as the target of evaluation. In the example of FIG. 12, "FACE INFORMATION" indicating a face of a person and "CAR NUMBER INFORMATION" representing a car number are set as the "SENSITIVE INFORMATION TYPE".

As described above, the output table 11f is information that represents, in cases where data including the sensitive information is input into the processing part 11a serving as a target of evaluation, whether or not data output from each output port includes sensitive information for each type of sensitive information. In other words, the output table 11f is information representing the processing result of the above scheme (a).

FIG. 13 is a diagram illustrating an example of requirement table 11g. As illustrated in FIG. 13, the requirement table 11g may include items of "No.", "PROCESSING PART", "INPUT PORT", and "SENSITIVE INFORMATION TYPE". In the requirement table 11g, entries are registered for each "PROCESSING PART" and also for each "INPUT PORT", so that past evaluation results may be accumulated.

The item "No." is identification information of an entry in the requirement table 11g. In the item "PROCESSING PART", one of or both the ID and the name of the processing part 11*a* of a target of evaluation may be set. In the item "INPUT PORT", one of or both the ID and the name of an input port may be set.

In the item "SENSITIVE INFORMATION TYPE", an evaluation result may be set for each type of a sensitivity degree serving as the target of evaluation. In the example of FIG. 13, "FACE INFORMATION" indicating a face of a person and "CAR NUMBER INFORMATION" representing a car number are set as the "SENSITIVE INFORMATION TYPE".

As described above, the requirement table 119 of FIG. 13 is information indicating whether or not the processing part 11*a* of a target of evaluation uses the sensitive information included in the input data for each sensitive information type. In other words, the requirement table 11*g* is information representing the processing result of the above scheme (b).

The evaluation result exhibitor 14 exhibits the evaluation result of a sensitivity degree made by the sensitivity degree evaluator 13 to the developer of the application 110. For example, the evaluation result exhibitor 14 may control, in cases where a graph is generated in accordance with operation that the terminal device 20 used by the developer of the application 110 makes on the development screen 100, the display style of an icon of each individual processing part 11*a* used in the graph on the basis of the evaluation result.

For this purpose, the evaluation result exhibitor 14 ray exemplarily include a searcher 14*a*, a display determiner 14*b*, and a display outputting unit 14*c*.

The searcher 14*a* searches for association between multiple processing parts 11*a* in the graph displayed on the development screen 100, in other words, connection relationship among the multiple processing parts 11*a*, on the basis of the graph information 11*e*.

The display determiner 14*b* determines, for the processing part 11*a* searched by the searcher 14*a* whether to change the display style of the association on the development screen 100 on the basis of the output table 11*f* and the requirement table 11*g*.

The display outputting unit 14*c* controls the display style on the development screen 100 on the basis of the determination result made by the display determiner 14*b*.

Furthermore, the display outputting unit 14*c* may execute the control of placing the filter 11*c* into the graph displayed on the development screen 100 in cooperation with the risk handler 12*c* in accordance with the determination result made by the display determiner 14*b*.

Hereinafter, detailed description will now be made in relation to the above sensitivity degree evaluator 13 and evaluation result exhibitor 14. In the following description, an output determining process and a requirement determining process of sensitive information executed by the sensitivity degree evaluator 13, and a changing process of a display style executed by the evaluation result exhibitor 14 will be detailed. Here, the server 10 can execute the output determining process, the requirement determining process, and the changing process independently of each other, or alternatively can execute two or more of these processes in parallel with each other or in chronologically succession.

Figure 14:
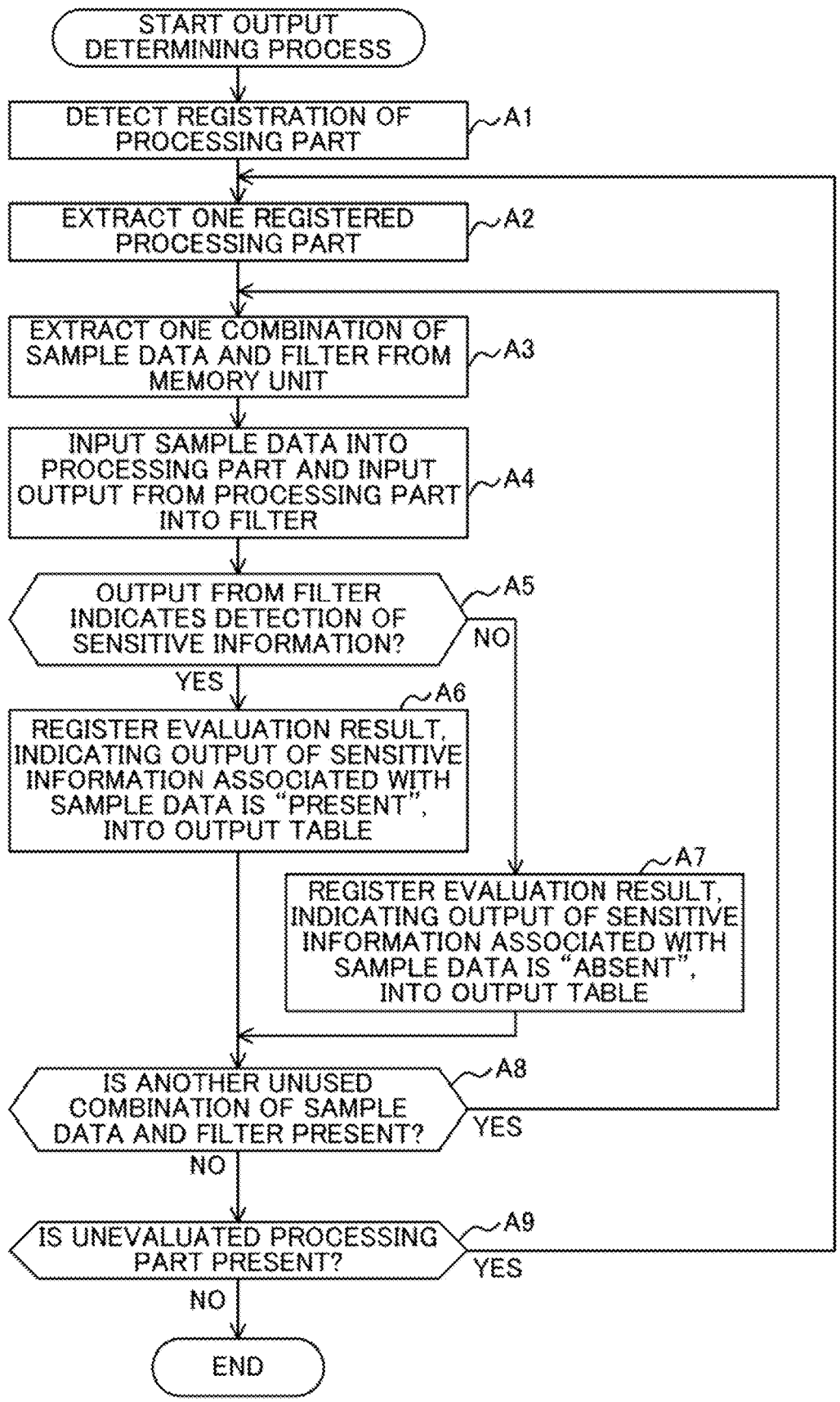
FIG. 14 is a flow diagram illustrating an example of an operation of an output determining process.
Figure 15:
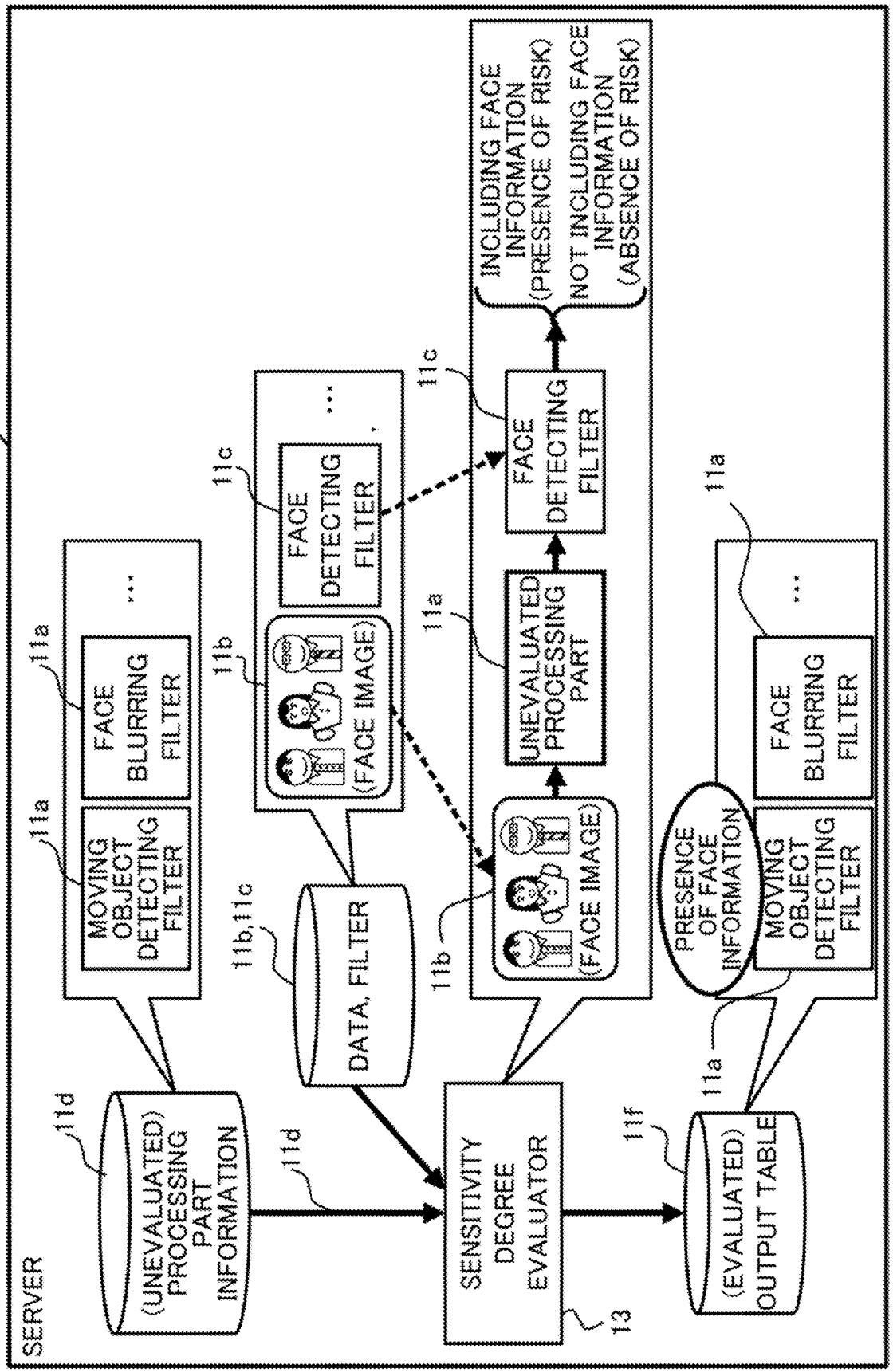
FIG. 15 is a diagram illustrating an example of an operation of the output determining process.

(1-3) Example of Operation of Output Determining Process of Sensitive Information:

First of all, description will now be made in relation to an output determining process of the sensitive information made by the sensitivity degree evaluator 13. The output determining process is an example of the above scheme (a). FIG. 14 is a flow diagram illustrating an example of the operation of the output determining process, and FIG. 15 is a diagram illustrating an example of the operation of the output determining process.

As illustrated in FIG. 14, the executor 13*a* of the sensitivity degree evaluator 13 detects that a processing part 11*a* is registered in the memory unit 11 by the processing part manager 12*a* through notification from the processing part manager 12*a* or monitoring of the processing part information 11*d*, for example (Step A1).

The executor 13*a* extracts one registered (unevaluated) processing part 11*a* as a processing part 11*a* of a target of evaluation from the processing part information 11*d* (Step A2). The extracted processing part 11*a* is one example of a first process.

For example, the executor 13*a* may extract information of one entry among one or more entries newly added to the processing part information 11*d*. In the example of FIG. 15, the executor 13*a* extracts information of a moving object detecting filter or a face blurring filter.

The executor 13*a* extracts one combination of data 11*b* and a filter 11*c* from the memory unit 11 (Step A3). The extracted data 11*b* is an example of first data and the extracted filter 11*c* is an example of a second process.

In the example of FIG. 15, the executor 13*a* extracts, as the data 11*b*, sample data of an image including a face, and extracts, as the filter 11*c* associated with the data, a face detecting filter. As the above, the filter 11*c* used in the output determining process may be a filter that can "detect" sensitive information in the data 11*b* associated with the filter 11*c*. Assuming that the data 11*b* is sample data of an image including a car number, the filter 11*c* may be a filter that detects a car number.

Next, the executor 13*a* inputs the extracted data 11*b* into the processing part 11*a* of the target of evaluation, and inputs an output from the same processing part 11*a* into the extracted filter 11*c* (Step A4, see the lower row of FIG. 3). The filter 11*c* is an example of a second process. The executor 13*a* is an example of an extractor that extracts the second data by executing the first process on the first data including the sensitive information.

In the example of FIG. 15, the executor 13*a* inputs the sample data of a face image into the processing part 11*a* and inputs the output from the same processing part 11*a* into the face detecting filter. The executor 13*a* may specify the output port of the processing part 11*a* connected to the input port of the filter 11*c* by referring to the processing part information 11*d* so that the data form of the input port matches that of the output port.

The determiner 13*b* determines whether or not the output from the filter 11*c* indicates detection of the sensitive information (Step A5). In the example of FIG. 15, the determiner 13*b* determines whether or not the face detecting filter detects face information in the data output from the processing part 11*a*.

In other words, the determiner 13*b* determines whether or not the second data includes sensitive information on the basis of a result of executing the second process on the second data by a module that is stored in association with the sensitive information and also that executes the second process that determines whether not sensitive information is included.

For example, the evaluation result exhibitor 14 may output a determination result as to whether sensitive information is included in the second data. In other words, the evaluation result exhibitor 14 is an example of a determination result outputting unit that outputs a determination result made by the determiner 13*b*. For example, the evaluation result exhibitor 14 may output the determination result in the form of a message onto the development screen 100, a log output to the memory unit 11, or in various other forms.

In cases where the output from the filter 11c is determined to exhibit detection of sensitive information (YES in Step A5), the information register 13c generates an entry of the output port of the processing part 11a serving as the target of evaluation and registers the evaluation result in the output table 11f (Step A6). At this time, the information register 13c sets "YES" in the entry which means the sensitive information associated with the data b is output (see items of "No.: 1, 2, 4, and 5" in FIG. 12).

In cases where the output from the filter 11c is determined not to exhibit detection of sensitive information (NO in Step A5), the information register 13c generates an entry of the output port of the processing part 11a serving as the target of evaluation and registers the evaluation result in the output table 11f (Step A7). At this time, the information register 13c sets "NO" in the entry which means the sensitive information associated with the data b is not output (see items of "No. 3 and 6" in FIG. 12).

This means that, in cases where the determiner 13b determines that sensitive information is included in the data output from the processing part 11a, the information register 13c stores the processing part 11a in the output table 11f in association with information related to the sensitive information.

Then the executor 13a determines whether or not another unused combination of the data 11b and the filter 11c is stored in the memory unit 11 (Step A8).

In cases whether another unused combination is determined to be stored (YES in Step A8), the process moves to Step A3 to extract another unused combination of the data 11b and the filter 11c and executes the output determining process of sensitive information. In the example of FIG. 15, the executor 13a may extract, for example, sample data of an image including a car number and a filter to detect a car number.

On the other hand, in cases where another unused combination is determined not to be stored (NO in Step A8), the executor 13a determines whether or not another unevaluated processing part 11a is present in the memory unit 11 by referring to, for example, the processing part information 11d (Step A9).

In cases where another unevaluated processing part 11a is determined to be present in the memory unit 11 (YES in Step A9), the process moves to Step A2 and the executor 13a executes an output determining process of sensitive information using the another unevaluated processing part 11a.

In contrast, in cases where another unevaluated processing part 11a is determined not to be present in the memory unit 11 (NO in Step A9), the process ends.

As described above, the server 10 that executes the output determining process of sensitive information according to an example of one embodiment can detect the presence or the absence of an output of the sensitive information from the processing part 11a related to the sample data (sample information). Consequently, in development of the application 110, the developer can make risk determination related to sensitive information of the processing part 11a on the basis of the detection result.

Here, in cases where a processing part 11a registration of which is detected or a processing part 11a similar to the same processing part 11a is already stored in the output table 11f, the determiner 13b may determine the presence or the absence of an output of the sensitive information from the processing part 11a on the basis of the registered contents in the output table 11f. A processing part 11a similar to the processing part 11a registration of which is detected may be, for example, a processing part 11a that executes the same process on the input data.

In other words, the determiner 13b determines whether or not the sensitive information is included in the second data on the basis of the sensitive information stored in association with the first process. Accordingly, the server 10 can thereby omit at least part of the output determining process, so that the processing load can be reduced. Also in this case, the evaluation result exhibitor 14 may output the determination result made by the determiner 13b.

(Example of Display Process)

Figure 16:
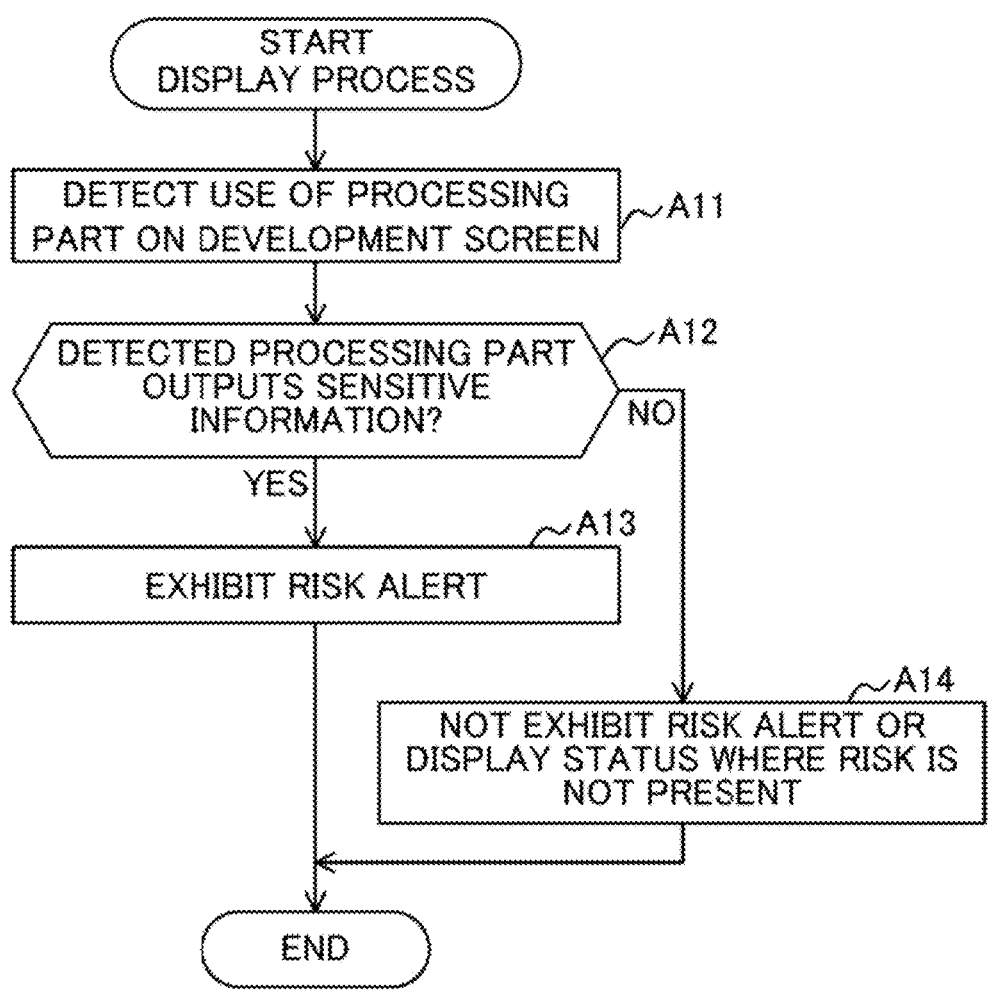
FIG. 16 is a flow diagram illustrating an example of an operation of a display process.
Figure 17:
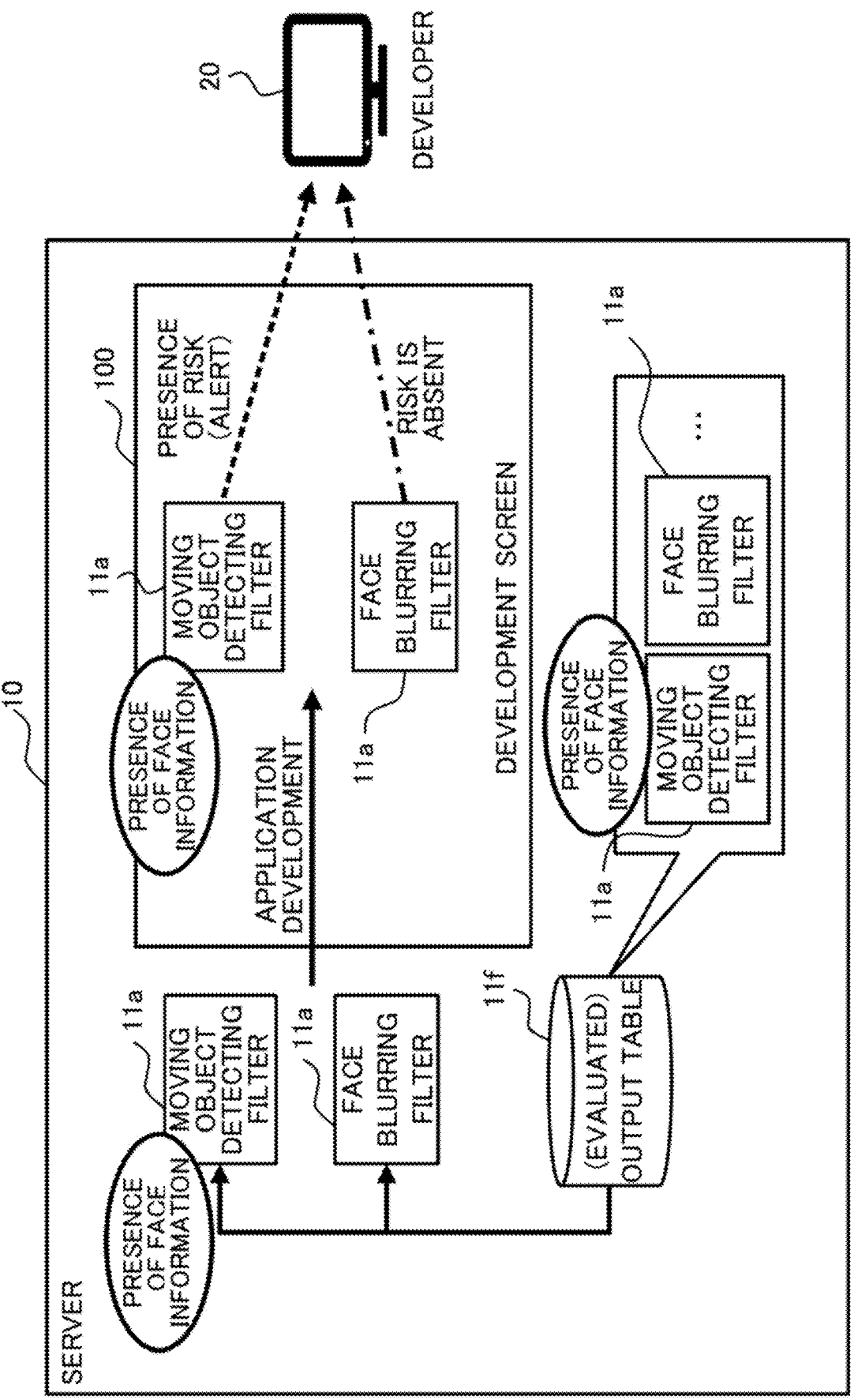
FIG. 17 is a diagram illustrating an example of an operation of the display process.

Next, description will now be made in relation to a display process that displays the processing result of the output determining process executed by the sensitivity degree evaluator 13. FIG. 16 is a flow diagram illustrating an example of the operation of the display process, and FIG. 17 is a diagram illustrating an example of the operation of the display process.

As illustrated in FIG. 16, the evaluation result exhibitor 14 detects that a processing part 11a is used on the development screen 100, e.g. the processing part 11a is arranged on the development screen 100, through, for example, notification from the graph manager 12b (Step A11). In the example of FIG. 17, the evaluation result exhibitor 14 detects that the moving object detecting filter and the face blurring filter have been arranged on the development screen 100.

The evaluation result exhibitor 14 determines whether or not the detected processing part 11a outputs sensitive information by referring to the output table 11f already evaluated in advance (Step A12).

In cases where determining that the detected processing part 11a outputs sensitive information (YES in Step A12), the evaluation result exhibitor 14 exhibits a risk alert on the development screen 100 (Step A13) and then the process ends. In the example of FIG. 17, since that the moving object detecting filter outputs face information is registered in the output table 11f, the evaluation result exhibitor 14 determines that the processing part 11a outputs the sensitive information and displays alert representing that a risk is present on the development screen 100.

In other words, the evaluation result exhibitor 14 is an example of an alert unit that determines whether or not the processing part 11a is stored in association with the sensitive information, and in cases where the processing part 11a is determined to be stored in association with the sensitive information, outputs an alert without making the determination by the sensitivity degree evaluator 13 on the basis of the filter 11c.

In contrast, in cases where determining that the detected processing part 11a does not output the sensitive information (NO in Step A12), the evaluation result exhibitor 14 does not display a risk alert or exhibits the indication of the absence of a risk on the development screen 100 (Step A14), and the process ends. In the example of FIG. 17, since that the face blurring filter does not output the sensitive information is registered in the output table 11f, the evaluation result exhibitor 14 determines that the processing part 11a does not output the sensitive information and displays the message of the absence of a risk on the development screen 100.

As described above, the server 10 exhibits a risk alert to the terminal device 20 when the processing part 11a having been detected (evaluated) to output the sensitive information on the basis of the output table 11f serving as the determination result of the output determining process. As the above, the server 10 can visually exhibit that the application 110 deals with sensitive information on the development screen 100. Accordingly, the developer can easily make risk determination.

The display process illustrated in FIGS. 16 and 17 is one example of a display process described with reference to FIG. 4.

Figure 18:
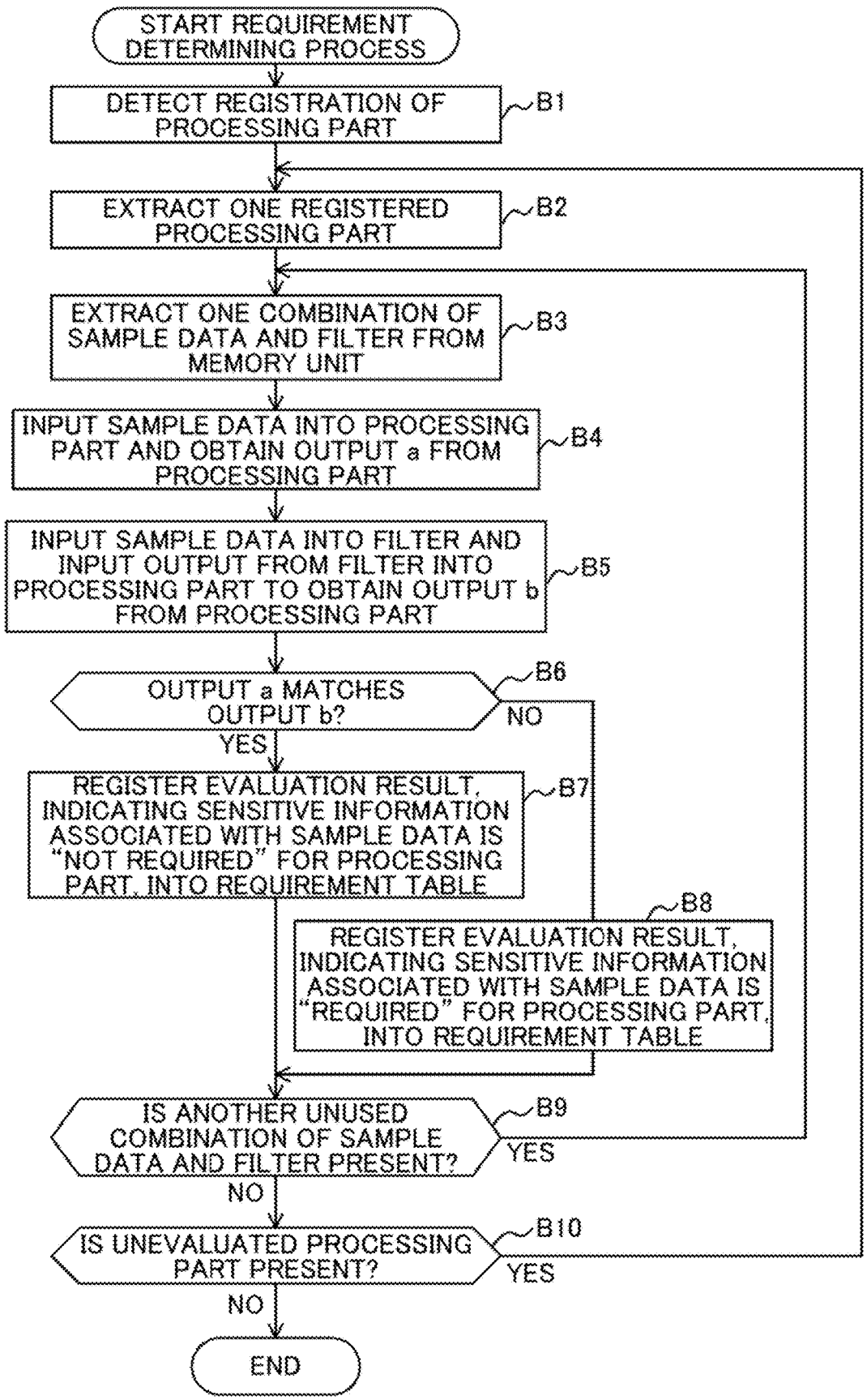
FIG. 18 is a flow diagram illustrating an example of an operation of a requirement determining process.

(1-4) Explanation of Requirement Determining Process of Sensitive Information:

Next description will now be made in relation to a requirement determining process on sensitive information performed by the sensitivity degree evaluator 13. The requirement determining process is an example of the above scheme (b). FIG. 18 is a flow diagram illustrating an example of the operation of the requirement determining process, and FIG. 19 is a diagram illustrating an example of the operation of the requirement determining process.

As illustrated in FIG. 18, like Steps A1 and A2 of FIG. 14, in cases of detecting registration of a processing part 11a (Step B1), the executor 13a of the sensitivity degree evaluator 13 extracts one registered processing part 11a from the processing part information 11d (Step B2). In the example of FIG. 19, the executor 13a extracts information of the gender detecting filter or the color detecting filter.

The executor 13a extracts one combination of data 11b and a filter 11c from the memory unit 11 (Step B3). The extracted data 11b is an example of the first data and the extracted filter 11c is an example of the second process.

Figure 19:
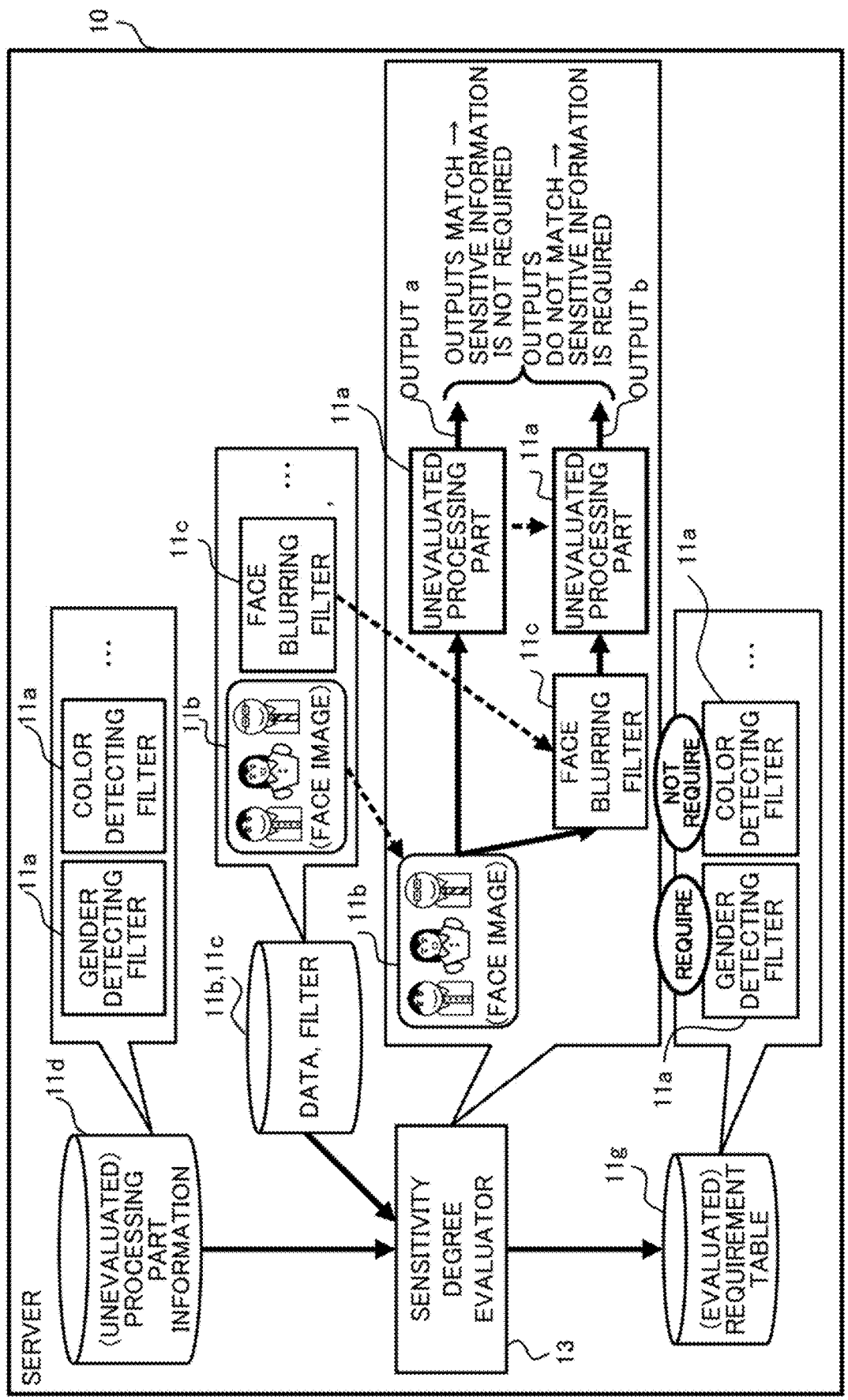
FIG. 19 is a diagram illustrating an example of an operation of the requirement determining process.

In the example of FIG. 19, the executor 13a extracts, as the data 11b, sample data of an image including a face, and extracts, as the filter 11c associated with the extracted data, a face blurring filter. As the above, the filter 11c used in the requirement determining process may be a filter that can "remove" the sensitive information in the data 11b associated with the filter 11c. Assuming that the data 11b is sample data of an image including a car number, the filter 11c may be a filter that removes (e.g., blurs) a car number.

Next, the executor 13a inputs the extracted data 11b into the processing part 11a of the target of evaluation, and obtains the output a from the same processing part 11a (Step B4, see the upper row of FIG. 5). In other words, the executor 13a is an example of an extractor that extracts the second data by executing the first process on the first data including the sensitive information.

The executor 13a inputs the extracted data 11b into the extracted filter 11c, and input the output from the same filter 11c into the processing part 11a of the target of evaluation to obtain the output b from the same processing part 11a (Step B5, see the lower row of FIG. 5). In other words, the executor 13a is an example of an outputting unit that executes the first processing on third data obtained by executing the second process to delete sensitive information on the first data and outputs resultant fourth data.

In the example of FIG. 19, the executor 13a inputs the sample data of a face image into the processing part 11a to obtain an output a, inputs sample data of a face image into a face blurring filter, and inputs the output from the same filter into the processing part 11a to obtain an output b. The executor 13a may specify the output port of the filter 11c to be connected to the input port of the processing part 11a by referring to the processing part information 11d so that the data form of the input port matches that of the output port.

The determiner 13b determines whether or not the output a obtained in Step B4 matches the output b obtained in Step B5 (Step B6). In the example of FIG. 19, the determiner 13b determines whether or not an output a of the processing part 11a obtained by inputting the sample data of an image including a face matches an output b of the processing part 11a obtained by inputting sample data of an image from which a face is removed. In other words, the determiner 13b determines, on the basis of a result of comparison between the second data and the fourth data, whether or not the first process is a process that uses the sensitive information.

In addition, for example, the evaluation result exhibitor 14 may output a determination result as to whether or not the first process is a process that uses the sensitive information. In other words, the evaluation result exhibitor 14 is an example of a determination result outputting unit that outputs a determination result made by the determiner 13b. For example, the evaluation result exhibitor 14 may output the determination result in the form of a message on the development screen 100, a log output to the memory unit 11, or in various other forms.

In cases where the output a is determined to match the output b (YES in Step B6), the information register 13c generates an entry of the input port of the processing part 11a serving as the target of evaluation, and registers the evaluation result in the requirement table 11g (Step B7). At this time, the information register 13c sets "NOT REQUIRED" in the entry which means the sensitive information related to data 11b is not required for the processing part 11a (see items of "No.: 1, 3, and 4" in FIG. 13).

In cases where the output a is determined not to match the output b (NO in Step B6), the information register 13c generates an entry of the input port of the processing part 11a serving as the target of evaluation and registers the evaluation result in the requirement table 11g (Step B8). At this time, the information register 13c sets "REQUIRED" in the entry which means the sensitive information related to data b is required for the processing part 11a (see item of "No. 2" in FIG. 13).

Then the executor 13a determines whether or not another unused combination of the data 11b and the filter 11c is stored in the memory unit 11 (Step B9).

In cases whether another unused combination is determined to be stored (YES in Step B9), the process moves to Step B3, the executor 13a extracts the unused combination of the data 11b and the filter 11c and executes the requirement determining process of the sensitive information. In the example of FIG. 19, the executor 13a may extract, for example, sample data of an image including a car number and a filter to blur a car number.

On the other hand, in cases where another unused combination is determined not to be stored (NO in Step B9), the executor 13a determines whether or not another unevaluated processing part 11a is present in the memory unit 11 (Step B10).

In cases where another unevaluated processing part 11a is determined to be present in the memory unit 11 (YES in Step B10), the process moves to Step B2 and the executor 13a executes the requirement determining process of the sensitive information using the another unevaluated processing part 11a.

In contrast, in cases where another unevaluated processing part 11a is determined not to be present in the memory unit 11 (NO in Step B10), the process ends.

As described above, the server 10 that executes the requirement determining process of sensitive information according to an example of one embodiment can determine whether or not the sensitive information of the processing part 11a is required by changing the presence or the absence of the sensitive information in the sample data (sample image) and comparing the changes of an output of the processing part 11a. Consequently, in development of the application 110, the developer can make risk determination related to the sensitive information of the processing part 11a on the basis of the determination result.

In addition, since the server 10 determines whether or not the processing part 11a requires the sensitive information, a more precise determination result than that made by the developer can be output.

In cases where the server 10 executes both the output determining process and the requirement determining process, either one of the process of Steps A1 and A2 of FIG. 14 and the process of Steps B1 and B2 of FIG. 18 is satisfactorily executed. The process of Steps A3 to A8 and the process of Step B3 to B9 may be executed in chronologically succession or in parallel with each other. The data 11b and the filter 11c extracted in Step A3 may be different from the data 11b and the filter 11c extracted in Step B3.

(Example of Display Process)

Figure 20:
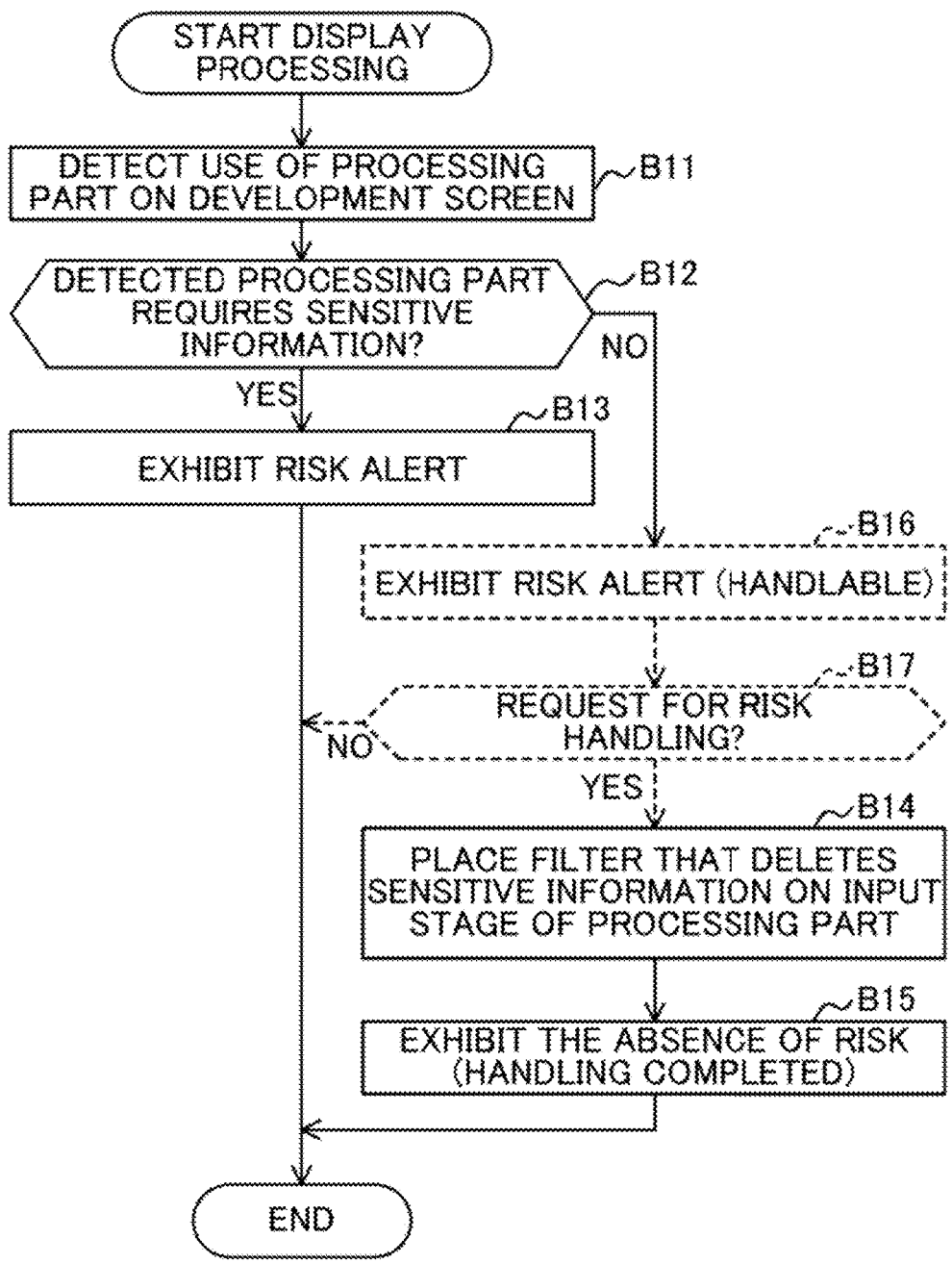
FIG. 20 is a flow diagram illustrating an example of an operation of a display process.
Figure 21:
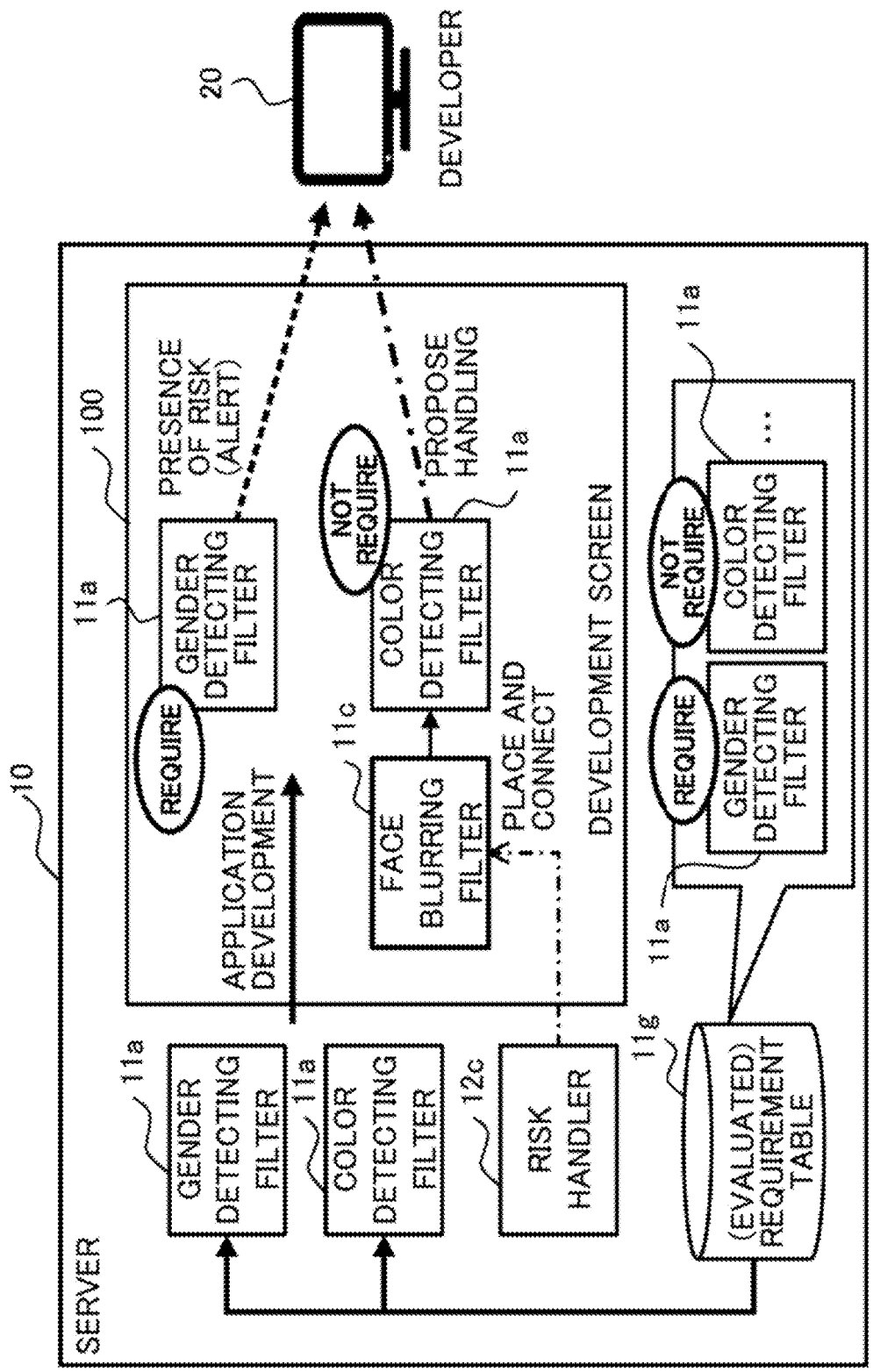
FIG. 21 is a diagram illustrating an example of an operation of the display process.

Next, description will now be made in relation to an example of a display process that displays a processing result of the requirement determining process executed by the sensitivity degree evaluator 13. FIG. 20 is a flow diagram illustrating an example of the operation of a display process, and FIG. 21 is a diagram illustrating an example of the operation of the display process.

As illustrated in FIG. 20, the evaluation result exhibitor 14 detects that a processing part 11a is used on the development screen 100 (Step B11) like Step A11 of FIG. 16. In the example of FIG. 21, the evaluation result exhibitor 14 detects that the gender detecting filter and the color detecting filter have been arranged on the development screen 100. That the processing part 11a is used is an example of receiving instruction of the first process on the first data.

The evaluation result exhibitor 14 determines, by referring to the requirement table 11g already evaluated in advance, whether or not the detected processing part 11a uses (requires) sensitive information (Step B12).

In cases where determining that the detected processing part 11a uses the sensitive information (YES in Step B12), the evaluation result exhibitor 14 exhibits a risk alert on the development screen 100 (Step B13) and the process ends. In the example of FIG. 21, since that the gender detecting filter uses the sensitive information is registered in the requirement table 11g, the evaluation result exhibitor 14 determines that the processing part 11a uses the sensitive information and displays an alert indicating the presence of a risk on the development screen 100.

In contrast, in cases where determining that the detected processing part 11a does not use the sensitive information (NO in Step B12), the evaluation result exhibitor 14 instructs the risk handler 12c to place a filter 11c to delete the sensitive information that the detected processing part 11a uses. For example, the evaluation result exhibitor 14 may specify the filter to be placed by referring to the requirement table 11g.

The risk handler 12c places (arranges) the specified filter 11c on the input side of the processing part 11a arranged on the development screen 100, and connects the output port of the filter 11c and the input port of the processing part 11a (Step B14). Furthermore, in order to incorporate the placed filter 11c into the graph, the risk handler 12c may update the graph information 11e.

In the example of FIG. 21, since that the color detecting filter does not use the sensitive information is registered in the requirement table 11g, the evaluation result exhibitor 14 determines that the processing part 11a does not use the sensitive information and instructs the risk handler 12c to place a face blurring filter. The risk handler 12c places the face blurring filter on the input side of the color detecting filter and connects these filters.

Next, the evaluation result exhibitor 14 displays a message indicating the absence of a risk (handling completed) on the development screen 100 (Step B15) and the process ends.

Furthermore, in cases of NO in Step B12, the evaluation result exhibitor 14 may execute a process of the following Steps B16 and B17 before Step B14.

For example, the evaluation result exhibitor 14 displays a risk alert indicating that the risk is handlable (Step B16) and inquires the terminal device 20 as to whether or not a risk handle is to be executed (see "PROPOSE HANDLING" in FIG. 21).

The evaluation result exhibitor 14 determines whether or not receiving a request for risk handling from the terminal device 20 (Step B17), and in cases of receiving the request (YES in Step B17), executes the process of Step B14. In contrast, in cases where the evaluation result exhibitor 14 does not receive the request for risk handling from the terminal device (e.g., in cases of receiving an instruction that risk handling is not required) (NO in Step B17), the process ends.

As the above, the evaluation result exhibitor 14 is an example of an alerting unit that outputs an alert in cases where the first process is a process that uses the sensitive information.

Furthermore, the evaluation result exhibitor 14 and the risk handler 12c serves as an alert unit that, in cases where the first process is a process that does not use the sensitive information, outputs information related to a second process to remove the sensitive information from the first data or executes the second process on the first data.

As described above, the server 10 exhibits a risk alert to the terminal device 20 in cases where a processing part 11a determined (evaluated) to use sensitive information on the basis of the requirement table 119 representing the determination result in the requirement determining process is to be used in the development screen 100. As the above, the server 10 can visually exhibit, on the development screen 100, handling of sensitive information in the application 110. This makes the developer easily to make risk determination.

In cases where a processing part 11a determined (evaluated) not to use sensitive information is to be used on the development screen 100, the server 10 places a filter 11c that removes the sensitive information on the input side of the processing part 11a and connects the filter to the processing part 11a. With this configuration, even if another processing part 11a that outputs the sensitive information is disposed upstream of the processing part 11a in question, the sensitive information can be removed by the filter 11c so that a risk related to the sensitive information can be reduced (e.g., eliminated).

Here, the display process of FIGS. 20 and 21 is an example of the display process described with reference to FIG. 6.

In cases where the server 10 executes both the output determining process and the requirement determining process, either one of the process of Step A11 of FIG. 16 and the process of Step B11 of FIG. 20 is satisfactorily executed. The process of Steps A12 to A14 and the process of Step B12 to B17 may be executed in chronologically succession or in parallel with each other. The display process executed in this case is an example of the display process described with reference to FIG. 7.

(1-5) Explanation of Changing Process of Display Style:

Next description will now be made in relation to a changing process of a display style by the evaluation result exhibitor 14. The changing process is an example of the above scheme (c). Hereinafter, description will now be made in relation to three embodiments of the changing process.

(First Embodiment of Changing Process)

Figure 22:
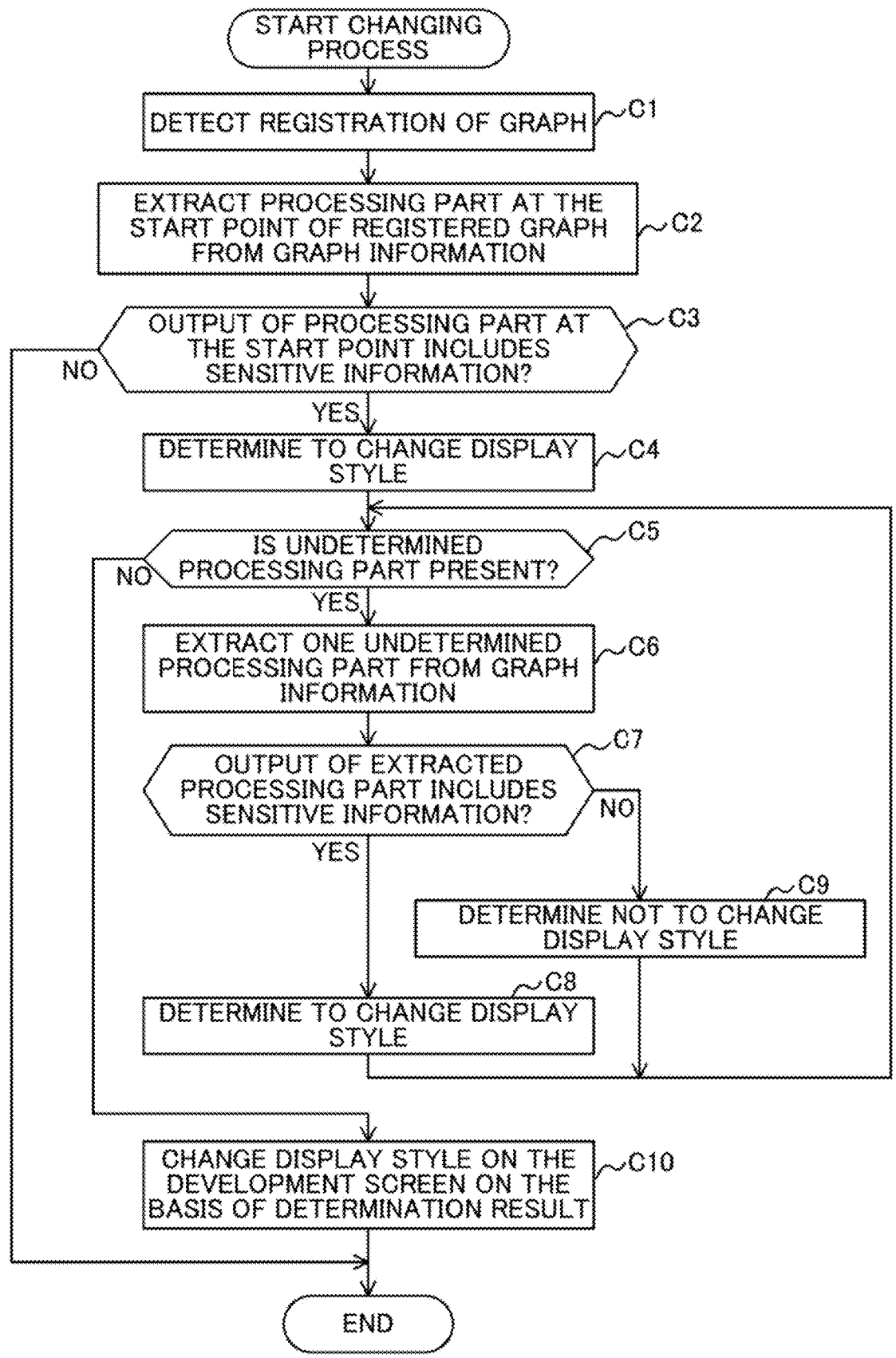
FIG. 22 is a flow diagram illustrating an example of an operation of a changing process.
Figure 23:
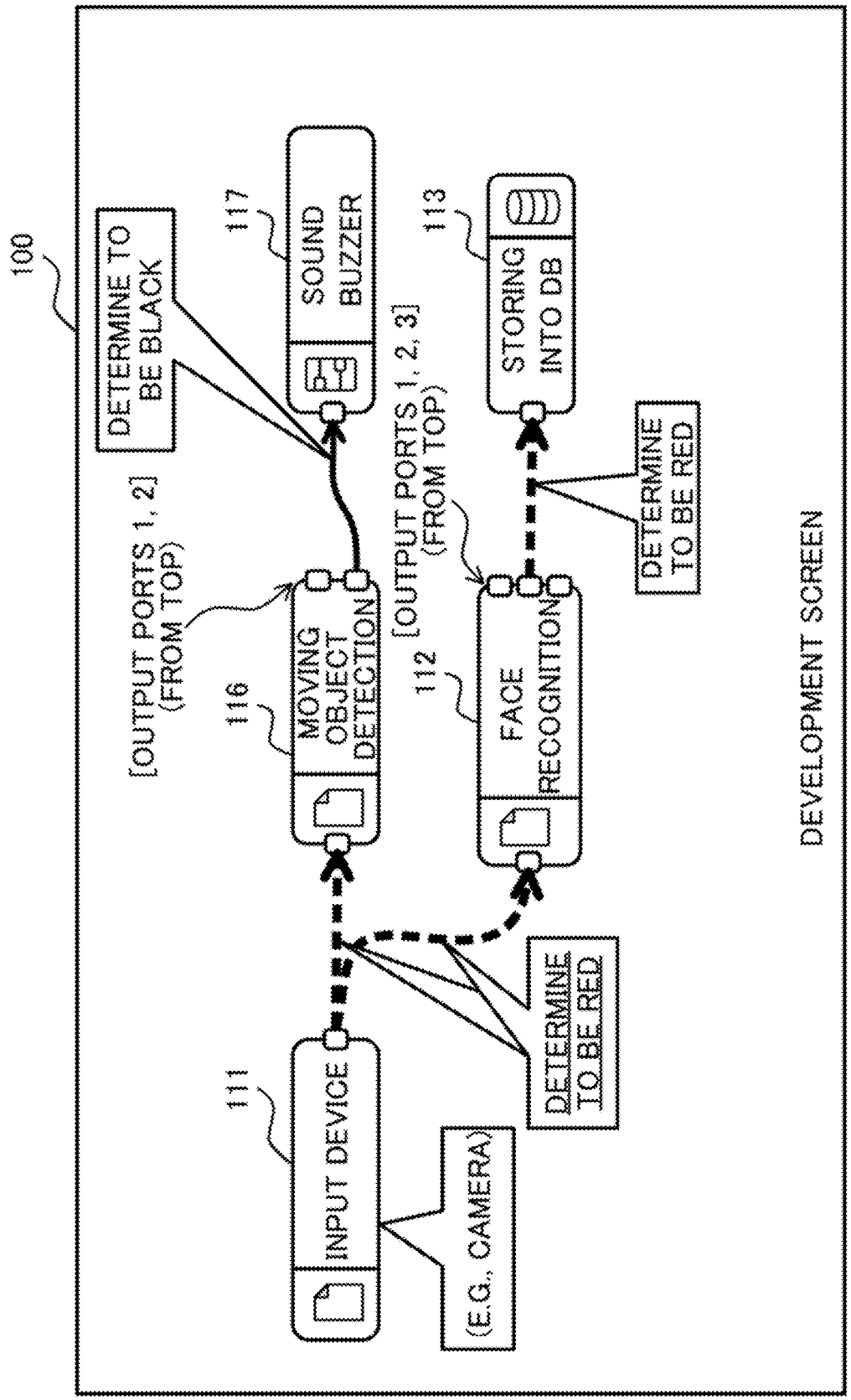
FIG. 23 is a diagram illustrating an example of an operation of the changing process.

In the first embodiment, description will now be made in relation to an example of the operation performed in cases where the evaluation result exhibitor 14 uses neither the output table 11f nor the requirement table 11g, or in cases where the evaluation result exhibitor 14 uses the output table 11f. FIG. 22 is a flow diagram illustrating an example of the operation of the changing process, and FIG. 23 is a diagram illustrating an example of the operation of the changing process.

As illustrated in FIG. 22, the evaluation result exhibitor 14 detects registration of a graph through generation of the graph on the development screen 100 or detection of generation or updating of the graph information 11e by the graph manager 12b (Step C1).

The searcher 14a of the evaluation result exhibitor 14 extracts a processing part 11a at the start point of the registered graph from the graph information 11e (Step C2). In this event, the searcher 14a may search for the processing part 11a at the starting point from the graph information 11e in a scheme of, for example, searching for a node not having a superordinate node by using a graph algorithm. In the example of FIG. 23, the searcher 14a extracts the input device 111 as the processing part 11a at the starting point from the graph information 11e (see FIG. 11).

The display determiner 14b determines whether or not the output from the processing part 11a at the starting point includes the sensitive information (Step C3). For example, the display determiner 14b may determine whether or not the output includes sensitive information in accordance with the type of the processing part 11a at the starting point.

Figure 24:
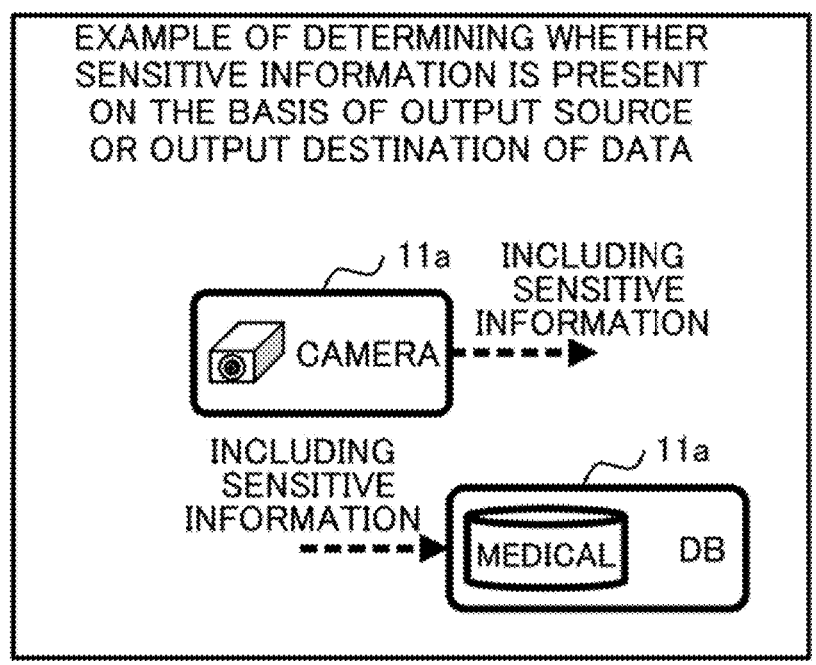
FIG. 24 is a diagram illustrating an example of determining whether sensitive information is present or not.

As an example, in cases where the processing part 11a at the starting point is an input device 111 such as a camera as illustrated in FIG. 24, the display determiner 14b may determine that the output from the input device 111 includes sensitive information caused by unexpected capturing into the image.

Otherwise, in cases where the server 10 executes the output determining process, the display determiner 14b may determine, by referring to the generated output table 11f, whether or not the sensitive information is output from the output port of the processing part 11a at the starting point.

In cases where the output of the processing part 11a at the starting point is determined not to include sensitive information (NO in Step C3), the process ends.

In contrast to the above, in cases where the output of the processing part 11a at the starting point is determined to include the sensitive information (YES in Step C3), the display determiner 14b determines to change the display style by, for example, exhibiting the output of the same processing part 11a in red, in the above scheme (Step C4).

The searcher 14a determines whether or not an undetermined processing part 11a is present in the graph information 11e (Step C5).

For example, the searcher 14a may determine, by referring to the graph information 11e, whether or not an undetermined processing part on the output side is present on the output side of the determined processing part 11a. In cases where a processing part on the output side is not present, the searcher 14a may determine, by referring to the graph information 11e, whether or not another undetermined processing part on the output side is present among processing parts 11a connected to the input side of the determined processing part 11a. As described above, the searcher 14a may search for an undetermined processing part 11a sequentially from the starting point to the end point of the graph in, for example, a scheme to search for a subordinate node, using a graph algorithm, for example.

In the example of FIG. 23, the searcher 14a specifies, as undetermined processing parts 11a, the moving object detection 116 and the face recognition 112 that are processing parts on the output side of the input device 111.

In cases where an undetermined processing part 11a is determined not to be present in the graph information 11e (NO in Step C5), the display outputting unit 14c changes the display style of the graph on the development screen 100 in accordance with the determination result made by the display determiner 14b (Step C10) and the process ends.

In cases where an undetermined processing part 11a is determined to be present in the graph information 11e (YES in Step C5), the searcher 14a extracts one undetermined processing part 11a from the graph information 11e (Step C6). In the example of FIG. 23, the searcher 14a selects the moving object detection 116.

The display determiner 14b determines whether or not the output of the extracted processing part 11a includes the sensitive information (Step C7). For example, the display determiner 14b may determine whether or not the output includes the sensitive information in accordance with the type of the extracted processing part 11a.

Figure 25:
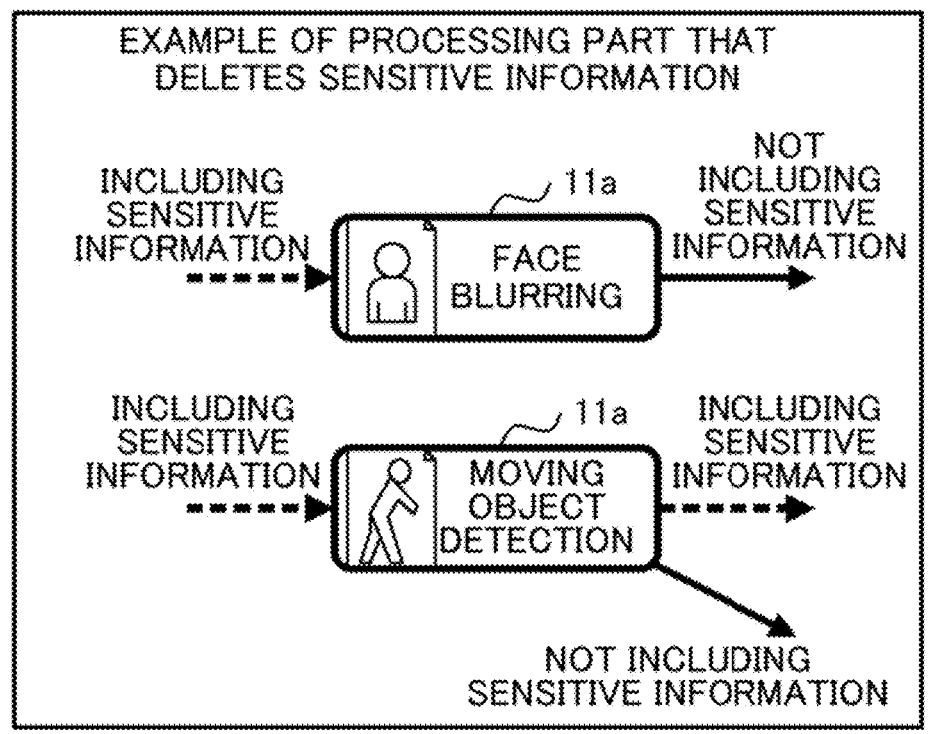
FIG. 25 is a diagram illustrating an example of a processing part that deletes sensitive information.

As an example, in cases where the extracted processing part 11a is a processing part 11a that deletes the sensitive information such as a face blurring filter and a moving object detecting filter as illustrated in FIG. 25, the display determiner 14b may determine that the extracted processing part 11a outputs data not including the sensitive information. Since the moving object detecting filter sometimes including sensitive information depending on its output port (see "DETECT MOVING OBJECT" in FIG. 10), the display determiner 14b may make the determination, s considering the output port of the extracted processing part 11a in the graph information 11e.

The display determiner 14b may determine whether or not the data output from the processing part 11a is data including sensitive information on the basis of information related to a contract associated with the data or a place of storage of the data. For example, in cases where the sensitive information is to be processed, a contract related to prior consent confirmation or data storage under restriction of a time period and a place of storage may be made between a data provider or an owner of personally identifiable information and the developer. This means that whether or not the data is the sensitive information may sometimes vary with condition of the place of storage and a contract.

Considering the above, the display determiner 14b may determine whether or not the data to be processed by the processing part 11a is data under such prior consent confirmation on the basis of information related to a place of storage and a contract. For example, in cases where the data is data for prior consent confirmation is made or data stored in a restricted place of storage, the display determiner 14b may determine not to change the display style even if the data output from the processing part 11a includes the sensitive information.

Otherwise, in cases where the server 10 executes the output determining process, the display determiner 14b may determine, by referring to the generated output table 11f, whether or not sensitive information is output from the output port of the extracted processing part 11a.

In cases where the output of the extracted processing part 11a is determined not to include the sensitive information (NO in Step C7), the display determiner 14b determines not to change the display style (Step 9) and the process moves to Step C5.

In contrast, in cases where the output of the extracted processing part 11a is determined to include sensitive information (YES in Step C7), the display determiner 14b determines to change the display style by, for example, exhibiting the output of the same processing part 11a in red, in the above scheme (Step C8). Then the process moves to Step C5.

In the example of FIG. 23, since the output port of the moving object detection 116 does not output 2 the sensitive information as illustrated in FIGS. 23 and 25, the display determiner 14b determines that the output of the moving object detection 116 does not include the sensitive information. In this case, the searcher 14a may inhibit searching for the processing part on the output side of the moving object detection 116 and search for another undetermined processing part 11a.

Figure 26:
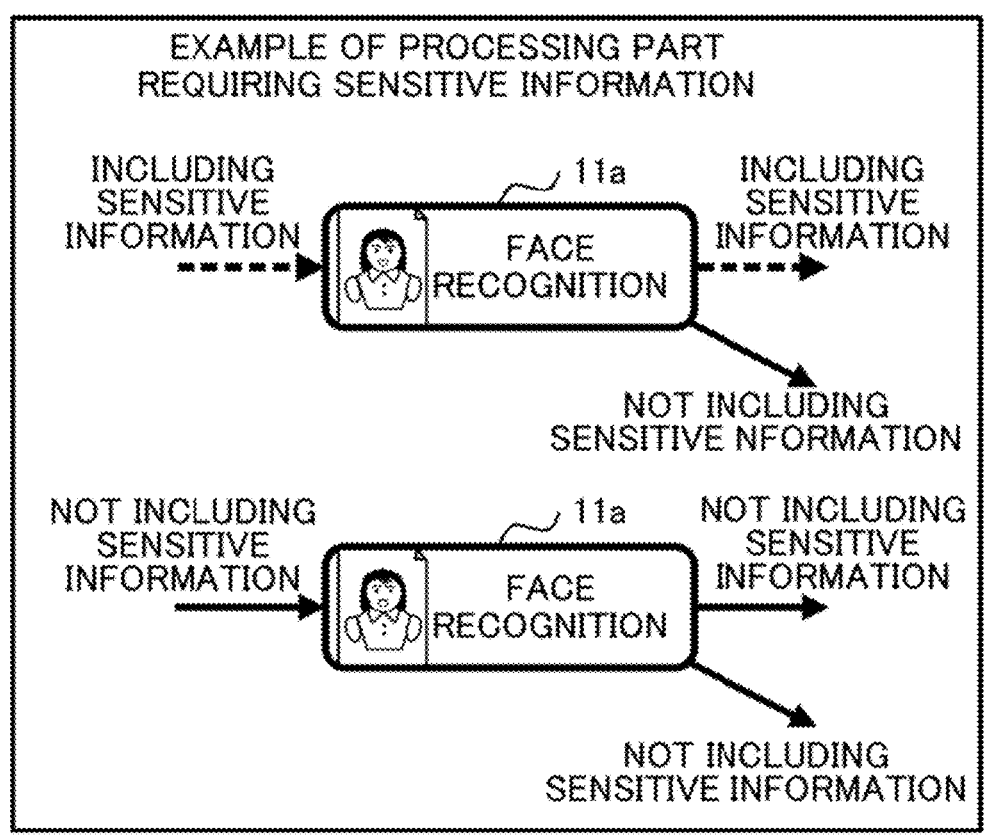
FIG. 26 is a diagram illustrating an example of a processing part requiring sensitive information.

Since the output port 1 of the face recognition 112 outputs the sensitive information when the sensitive information is input therein as illustrated in FIGS. 23 and 26, the display determiner 14b determines that the output of the face recognition 112 includes the sensitive information.

Otherwise, in cases where the server 10 executes the output determining process, the display determiner 14b may determine, by referring to the generated output table 11f, the presence or the absence of the sensitive information (e.g., face information) of each of an output port 2 of the moving object detection 116 and an output port 2 of the face recognition 112.

In the example of FIG. 23, the searcher 14a extracts the storing-into-DB 113 as the processing part on the output side of the face recognition 112 in Steps C5 and C6 performed after the face recognition 112.

Since, the storing-into-DB 113 does not have an output, the display determiner 14b determines not to change the display style of the downstream (output side) of the storing-into-DB 113. In the storing-into-DB 113, the sensitive information input from the input side is stored without any modification. Therefore, in cases where the storing-into-DB 113 is storing into DB related to health or medical matter, for example, the health data can be regarded as the sensitive information. As the above, the display determiner 14b may determine whether or not data between icons includes the sensitive information, depending on a place of storage of the data.

The storing-into-DB 113 is the end point of the graph and therefore does not have the processing part on the output side. For the above, the result of the process comes to be "NO" in Step C5 after the determination on the storing-into-DB 113, the display style of the graph by the display outputting unit 14c is changed (see FIG. 23), and the process ends.

In changing the display style, the display outputting unit 14c may change the display style at least either one of the associated icons at the starting point and the end point including sensitive information. In the example of FIG. 23, the display outputting unit 14c may change the display style of between the input device 111 and the moving object detection 116, between the input device 111 and the face recognition 112, and between the face recognition 112 and the storing-into-DB 113.

(Second Embodiment of Changing Process)

Figure 27:
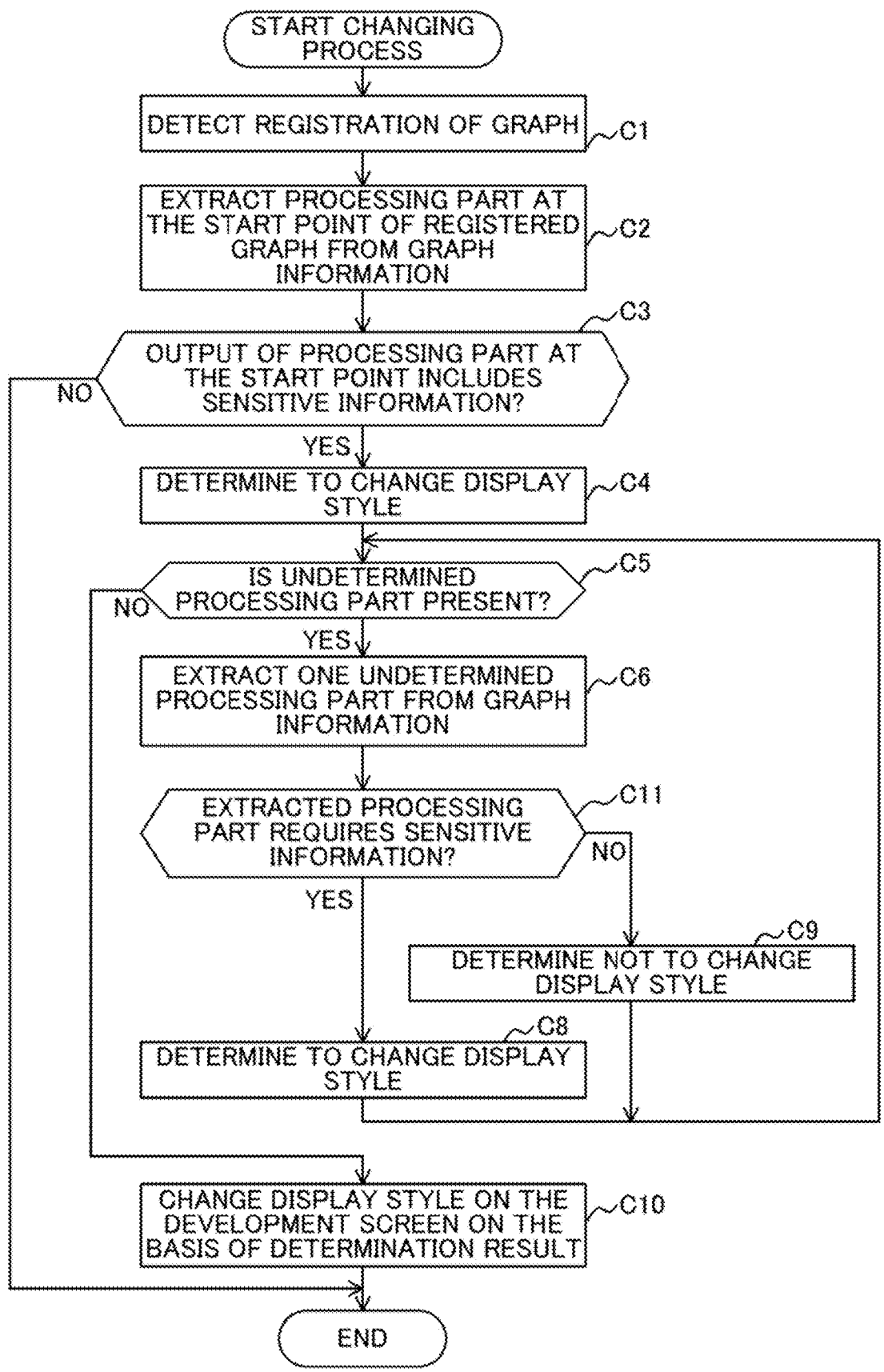
FIG. 27 is a flow diagram illustrating an example of an operation of a changing process.

In the second embodiment, description will now be made in relation to an example of operation in cases where the evaluation result exhibitor 14 uses neither the output table 11f nor the requirement table 11g, and uses the requirement table 11g. FIG. 27 is a flow diagram illustrating an example of the operation of the changing process. In the following description, the same processes as that of the flow diagram FIG. 22 will be omitted.

As illustrated in FIG. 27, in cases where an undetermined processing part 11a is extracted in Step C6, the display determiner 14b determines whether or not the extracted processing part 11a requires sensitive information (Step C11). For example, the display determiner 14b may determine whether or not the processing part 11a requires sensitive information, depending on the type of the extracted processing part 11a.

As an example, in cases where the extracted processing part 11a is a processing part 11a that requires sensitive information such as face recognition as illustrated in FIG. 26, the display determiner 14b may determine, on the basis of whether or not the sensitive information is included in the input of the extracted processing part 11a, whether or not the sensitive information is required.

Otherwise, in cases where the server 10 executes the requirement determining process, the display determiner 14b may determine, by referring to the generated requirement table 11g, whether or not the extracted processing part 11a requires the sensitive information.

In cases where the display determiner 14b determines that the extracted processing part 11a does not require the sensitive information (NO in Step C11), the process moves to Step C9. In contrast, in cases where the display determiner 14b determines that the extracted processing part 11a requires the sensitive information (YES in Step C11), the process moves to Step C8.

Alternatively, in the second embodiment, the searcher 14a may extract the processing part on the output side of the processing part 11a the display style of which is determined not to be changed in Step C9 in ensuing Steps C5 and C6.

(Third Embodiment of Changing Process)

Figure 28:
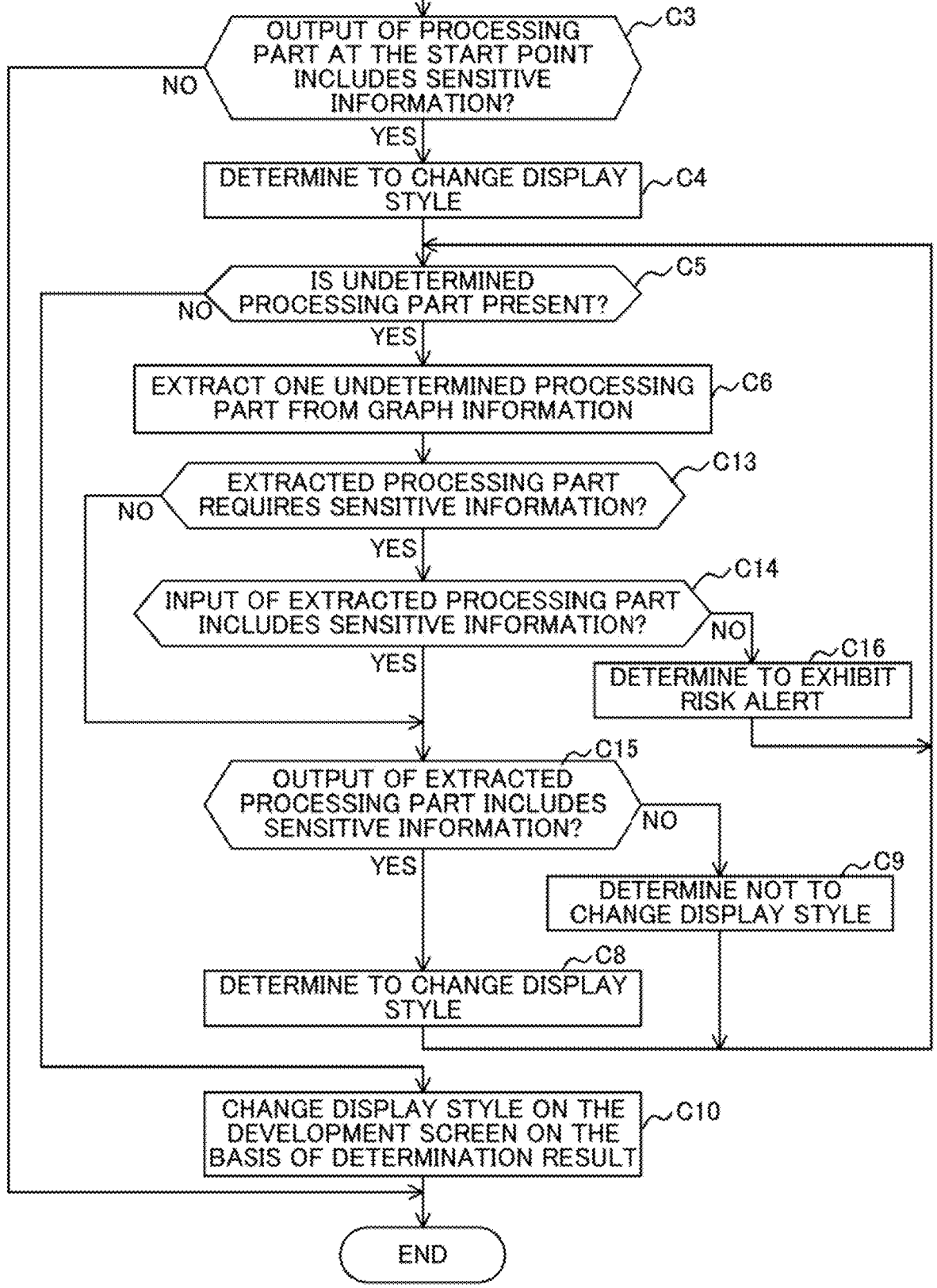
FIG. 28 is a diagram illustrating an example of an operation of a changing process.

In the third embodiment, description will now be made in relation to an example of the operation in cases where the evaluation result exhibitor 14 uses both the output table 11f and requirement table 11g. FIG. 28 is a flow diagram illustrating an example of the operation of the changing process. In the following description, the same processes as that of the flow diagrams FIGS. 22 and 27 will be omitted.

As illustrated in FIG. 28, in cases where an undetermined processing part 11a is extracted in Step C6, the display determiner 14b determines whether or the extracted processing part 11a requires the sensitive information (Step C13). For example, the display determiner 14b determines, by referring to the requirement table 11g, whether or not the input port of the extracted processing part 11a requires the sensitive information.

In cases where the extracted processing part 11a does not require the sensitive information (NO in Step C13), the display determiner 14b determines whether or not the output of the extracted processing part 11a includes the sensitive information (Step C15). For example, the display determiner 14b determines, by referring to the generated output table 11f, whether or not the output from the output port of the extracted processing part 11a includes the sensitive information.

In cases where the sensitive information is not included in the output (NO in Step C15), the process moves to Step C9. That is, the display determiner 14*b* determines not to change the display style.

In cases where the sensitive information is included in the output (YES in Step C15), the process moves to Step C8. That is, the display determiner 14*b* determines to change the display style.

In the example of FIG. 23, the display determiner 14*b* determines that the input port of the moving object detection 116 does not require the sensitive information (e.g., face information) (see "No.: 1" in FIG. 13). In addition, the display determiner 14*b* determines that the output port 2 of the moving object detection 116 does not output the sensitive information (see "No.: 3" in FIG. 12). Accordingly, the display determiner 14*b* determines not to change the display style of the output of the moving object detection 116 (Step C9).

After making determination on the moving object detection 116, the display determiner 14*b* determines that the sound-buzzer 117, which is detected by the searcher 14*a*, does not require the sensitive information, and also determines that the output of the sound-buzzer 117 does not include sensitive information because the sound-buzzer 117 does not have an output port.

In cases of determining that the extracted processing part 11*a* requires sensitive information in Step C13 (YES in Step C13), the display determiner 14*b* determines whether or not the input of the extracted processing part 11*a* includes the sensitive information (Step C14). For example, the display determiner 14*b* may determine, on the basis of the previous determination result, whether or not the sensitive information is included in the output of the processing part 11*a* (processing part on the input side) connected to the input side of the extracted processing part 11*a*.

In cases where determining that the input does not include sensitive information (NO in Step C14), the display determiner 14*b* determines to exhibit a risk alert (Step C16) and the process moves to Step C5.

In cases where determining that the input includes sensitive information (YES in Step C14), the process moves to Step C15. For example, as described above, the display determiner 14*b* determines whether or not the output of the extracted processing part 11*a* includes the sensitive information.

In cases where the output does not include the sensitive information (NO in Step C15), the process moves to Step C9. That is, the display determiner 14*b* determines not to change the display style.

In cases where the output includes the sensitive information (YES in Step CIS), the process moves to Step C8. That is, the display determiner 14*b* determines to change the display style.

In the example of FIG. 23, the display determiner 14*b* determines that the input port of the face recognition 112 requires the sensitive information (e.g., face information) (see "No.: 2" in FIG. 13), and also determines that the output port 2 of the face recognition 112 outputs the sensitive information (see "No.: 5" in FIG. 12). Accordingly, the display determiner 14*b* determines to change the display style of the output of the face recognition 112 (Step C8).

As described above, the server 10 that executes the changing process of a display style according to an example of one embodiment can change the display style between the processing parts 11*a* displayed on the development screen 100 on the basis of the presence or the absence of sensitive information in data transferred between the same processing parts 11*a*. Thereby, the developer can easily determine the risk related to the sensitive information in the development stage of the application 110 by means of visual exhibition.

In other words, the evaluation result exhibitor 14 is an example of a display controller that changes, under a state where multiple icons representing information related to devices or processes are displayed on the development screen 100 in association with each other, the display style between the icons in accordance with whether or not the data transferred between the devices or processes specified by the multiple associated icons includes the sensitive information.

Figure 29:
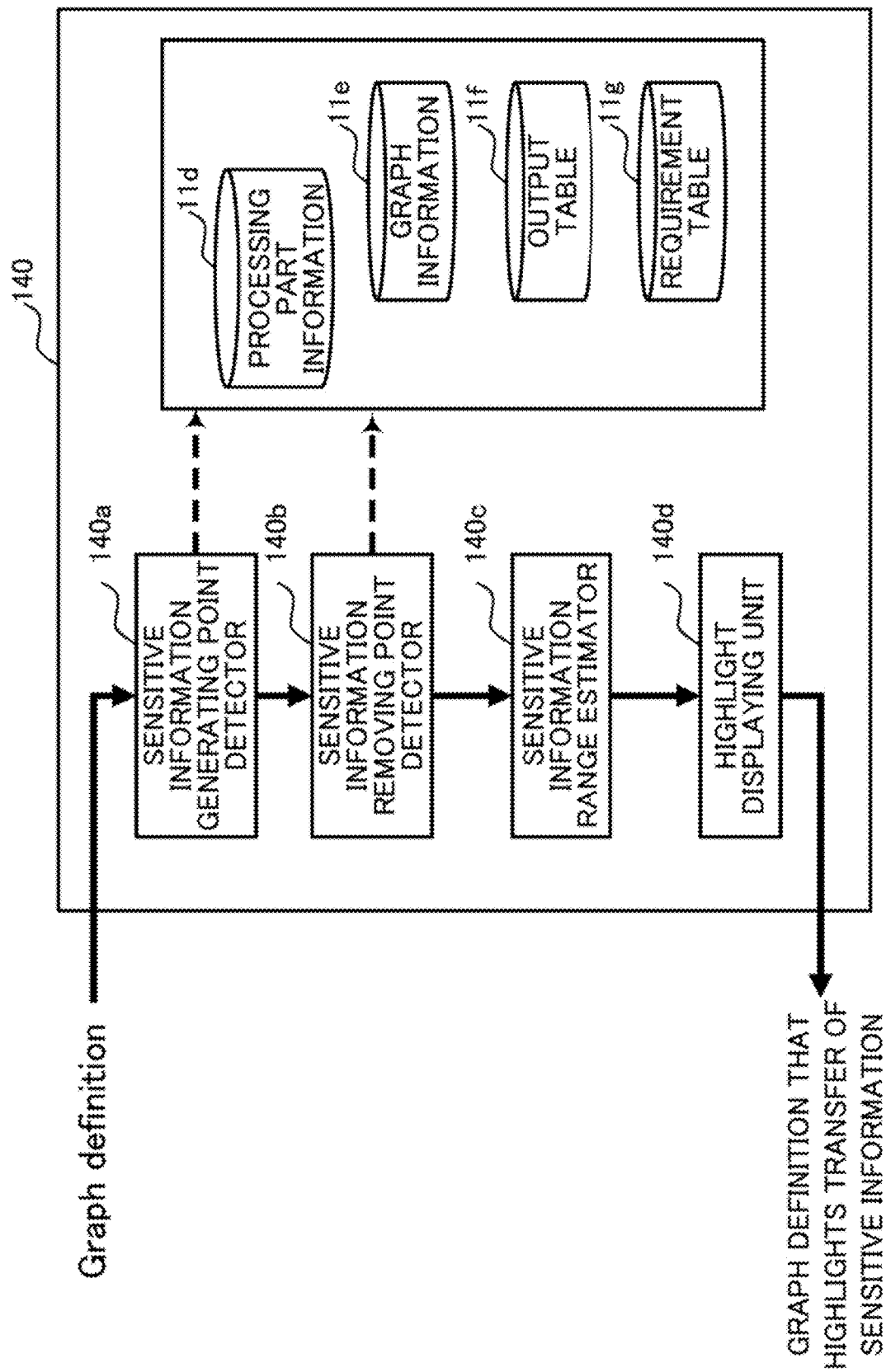
FIG. 29 is a block diagram schematically illustrating an example of a functional configuration of a display controller.

Prom another aspect, the function of the evaluation result exhibitor 14 that execute the above-described processing can be regarded as a display controller 140 exemplarily illustrated in FIG. 29.

The display controller 140 may exemplarily include a sensitive information generating point detector 140*a*, a sensitive information removing point detector 140*b*, a sensitive information range estimator 140*c*, and a highlight displaying unit 140*d*. The display controller 140 may further include, as information that these functional blocks 140*a* to 140*d* refer to, the processing part information 11*d*, the graph information 11*e*, the output table 11*f*, and the requirement table 11*g*.

The sensitive information generating point detector 140*a* and the sensitive information removing point detector 140*b* detect a processing part 11*a* for which sensitive information is generated and a processing part 11*a* for which sensitive information is removed, respectively, and are examples of the searcher 14*a* and the display determiner 14*b*, respectively.

The sensitive information range estimator 140*c* estimates a range in which data transferred between processing parts 11*a* in a graph includes the sensitive information, and is an example of the display determiner 14*b*.

The highlight displaying unit 140*d* highlights (e.g., exhibits in read) the connecting line between the processing parts 11*a* in the range estimated by the sensitive information range estimator 140*c*, and is an example of the display outputting unit 14*c*.

(1-6) Modification:

The sensitivity degree evaluator 13 of one embodiment determines, for each type of sensitive information, whether or not a processing part 11*a* outputs the sensitive information and whether or not a processing part 11*a* uses the sensitive information. The evaluation result exhibitor 14 of the modification may output the evaluation result made by the sensitivity degree evaluator 13 for each type of sensitive information.

Figure 30:
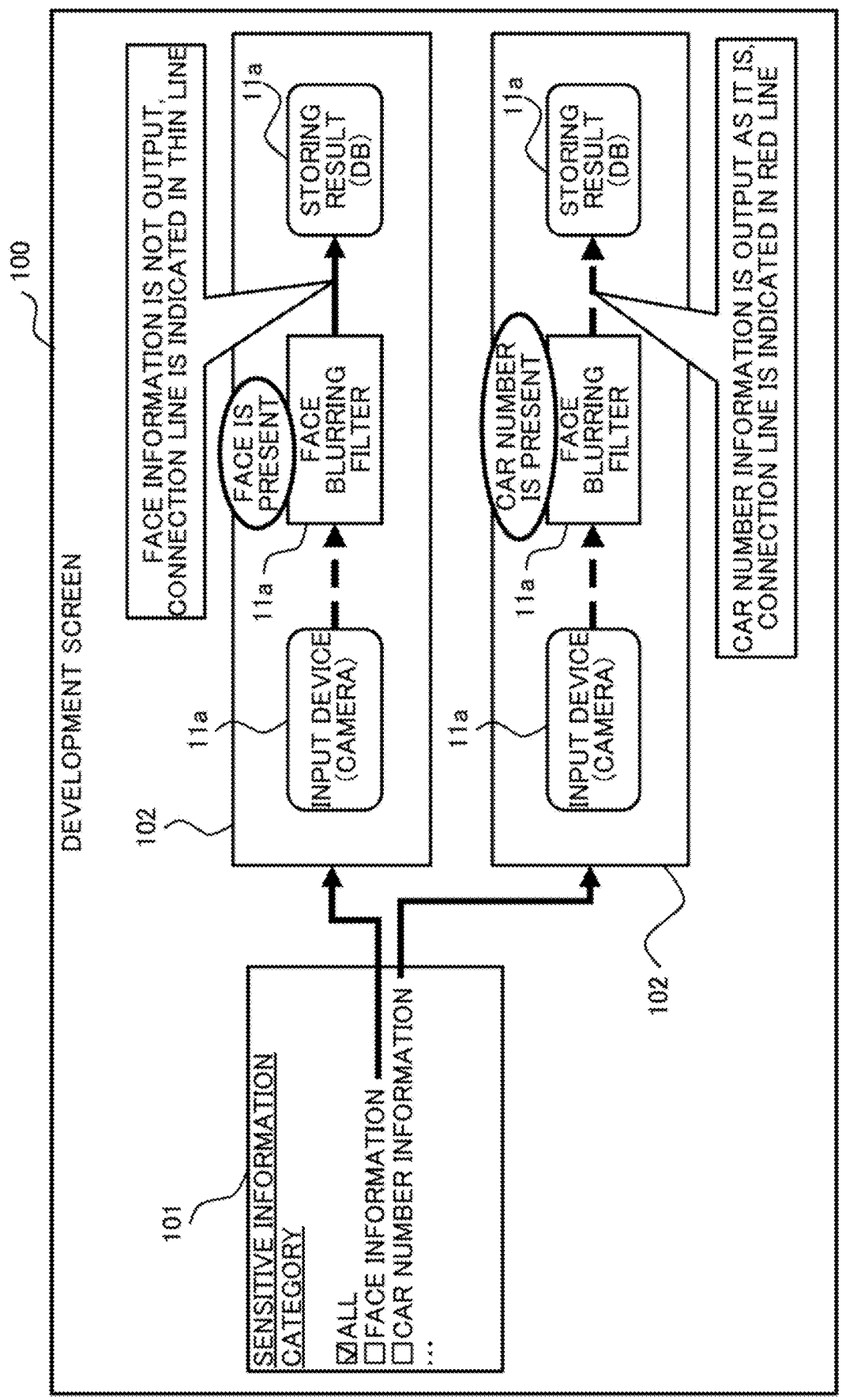
FIG. 30 is a diagram illustrating a modification of a displaying scheme of a graph on a development screen.

FIG. 30 is a diagram illustrating a modification of a display style of a graph on the development screen 100. As illustrated in FIG. 30, the development screen 100 may include a selection region 101 to select the type (category) of sensitive information to be displayed on the development screen 100 and one or more displaying regions 102 to display an evaluation result in association with the selected type.

For example, in cases where an item "ALL" is selected on the selection region 101, the evaluation result exhibitor 14 may display displaying regions 102 as many as the number of types of the sensitive information on the development screen 100, and may further display the graph of each type of sensitive information in association with corresponding one of the displaying regions 102 on the development screen 100. The display style of each graph may be changed in accordance with the evaluation result of the corresponding type of sensitive information.

In cases where one of the types of sensitive information is selected on the selection region 101, the evaluation result exhibitor 14 may display one displaying region 102 on the development screen 100 and display a graph the display style of which is changed in accordance with the evaluation result in association with the selected sensitive information.

This makes the developer easy to make risk determination of each type of sensitive information.

Figure 31:
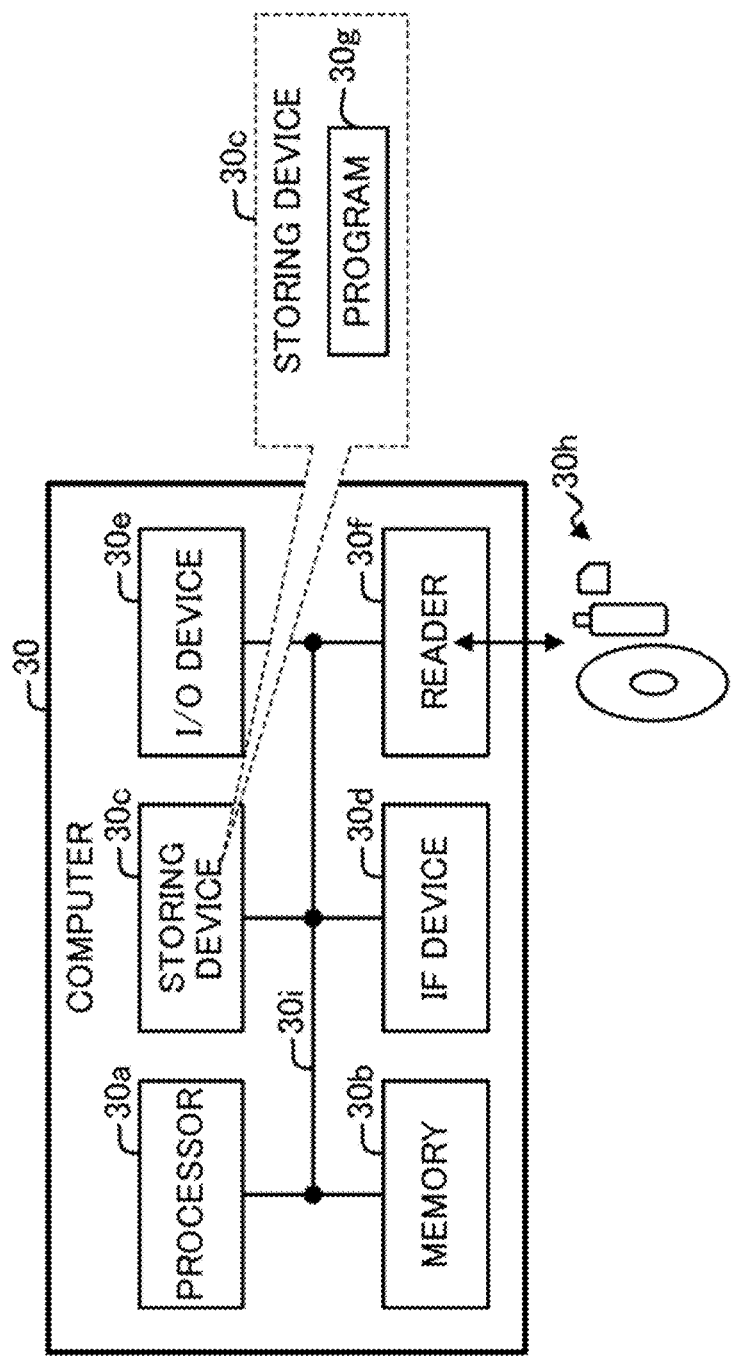
FIG. 31 is a diagram illustrating an example of a hardware configuration according to one embodiment.

(1-7) Example of Hardware Configuration:

FIG. 31 is a block diagram schematically illustrating an example of HW configuration of a computer 30 that achieves the function of the sever 10. In cases where multiple computers are used as the HW resource that achieves the function of the server 10, each of the computers may have the HW configuration exemplarily illustrated in FIG. 31.

As illustrated in FIG. 31, the computer 30 may exemplarily include a processor 30*a*, a memory 30*b*, a storing device 30*c*, an IF (Interface) device 30*d*, an I/O (Input/Output) device 30*e*, and a reader 30*f* as the HW configuration.

The processor 30*a* is an example of an arithmetic processing apparatus that performs various controls and arithmetic operations. The processor 30*a* may be communicably connected to the blocks in the computer 30 to each other via a bus 30*i*. In one embodiment, the processor 30*a* may be a multiprocessor including multiple processors, or a multi-core processor having multiple processor cores, or have a configuration consisting of multiple multi-core processors.

An example of the processor 30*a* is an Integrated Circuit (IC) such as a Central Processing Unit (CPU), a Micro Processing Unit (MPU), a Graphics Processing Unit (GPU), an Accelerated Processing Unit (APU), a Digital Signal Processor (DSP), an Application Specific IC (ASIC), and a Field-Programmable Gate Array (FPGA). Alternatively, the processor 30*a* may be a combination of two or more ICs exemplified as the above.

The memory 30*b* is an example of a HW device that stores information such as various data pieces and a program. An example of the memory 30*b* includes one or both a volatile memory such as the Dynamic Random Access Memory (DRAM), and a non-volatile memory such as the Persistent Memory (PM).

The storing device 30*c* is an example of a HW device that stores various data and programs. Examples of the storing device 30*c* is various storing devices exemplified by a magnetic disk device such as a Hard Disk Drive (HDD), a semiconductor drive device such as an Solid State Drive (SSD), and a non-volatile memory. Examples of a non-volatile memory are a flash memory, a Storage Class Memory (SCM) and a Read Only Memory (ROM).

The storing device 30*c* may store a program 30*g* (one of or both an information processing program and a screen displaying program) that achieves all or part of the functions of the computer 30. For example, the processor 30*a* of the sever 10 expands the program 30*g* stored in the storing device 30*c* onto the memory 30*b* and executes the expanded program 30*g*, so that the function as the server 10 illustrated in FIG. 9 or 29 can be achieved.

A memory region possessed by at least one of the memory 30*b* and the storing device 30*c* is an example of the memory unit 11 and may store various information pieces 11*a* to 11*g*.

The IF device 30*d* is an example of a communication IF that controls connection to and communication with a network. For example, the IF device 30*d* may include an adaptor compatible with a LAN such as Ethernet (registered trademark) and an optical communication such as Fibre Channel (FC). The adaptor may be compatible with one of or both wired and wireless communication schemes. For example, the program 30*g* may be downloaded from a network to a computer 30 through the communication IF and then stored into the storing device 30*c*.

The I/O device 30*e* may include one of or both the input device and an output device. Examples of the input device are a keyboard, a mouse, and a touch screen. Examples of the output device are a monitor, a projector, and a printer.

The reader 30*f* is an example of a reader that reads information of data and programs recorded on a recording medium 30*h*. The reader 30*f* may include a connecting terminal or a device to which the recording medium 30*h* can be connected or inserted. Examples of the reader 30*f* include an adapter conforming to, for example, Universal Serial Bus (USB), a drive apparatus that accesses a recording disk, and a card reader that accesses a flash memory such as an SD card. The program 30*g* may be stored in the recording medium 30*h*. The reader 30*f* may read the program 30*g* from the recording medium 30*h* and store the read program 30*g* into the storing device 30*c*.

An example of the recording medium 30*h* is a non-transitory recording medium such as a magnetic/optical disk, and a flash memory. Examples of the magnetic/optical disk include a flexible disk, a Compact Disc (CD), a Digital Versatile Disc (DVD), a Blu-ray disk, and a Holographic Versatile Disc (HVD). Examples of the flash memory include a semiconductor memory such as a USB memory and an SD card.

The HW configuration of the computer 30 described above is merely illustrative. Accordingly, the computer 30 may appropriately undergo increase or decrease of HW (e.g., addition or deletion of arbitrary blocks), division, integration in an arbitrary combination, and addition or deletion of the bus. For example, at least one of the I/O device 30*e* and the reader 30*f* may be omitted in the sever 10.

The functions of the terminal device 20 serving as an example of an information processing terminal may be achieved by the same HW configuration as that of the computer 30 described above. For example, the processor 30*a* of the terminal device 20 can achieve the function as the terminal device 20 by expanding the program 30*g* stored in the storing device 30*c* onto the memory 30*b* and executing the expanded program 30*g*.

(2) Miscellaneous

The technique disclosed in the above one embodiment can be modified or changed as follows.

For example, the functional blocks illustrated in FIGS. 9 and 29 may be merged or separated in any arbitrary combination.

In the above one embodiment and modifications, the sensitive information is assumed to be an image, but the sensitive information is not limited to an image. Alternatively, the sensitive information may be a letter string including personally identifiable information or sound (e.g., voice) including personally identifiable information. The processing part 11*a* and the filter 11*c* satisfactorily execute processing suitable for the form of the sensitive information. For example, in cases where the sensitive information is a letter string or sound, the processing part 11*a* and the filter 11*c* may be modules that execute processing such as process, detection, and removal on the letter string or sound.

Furthermore, in the one embodiment and the modifications, the sensitivity degree evaluator 13 makes evaluation for each type of sensitive information and further the evaluation result exhibitor 14 in the modification displays the graph for each type of sensitive information. However, the evaluation and the displaying are not limited to this. One type of sensitive information may be treated.

As one aspect, whether or not a process uses sensitive information can be precisely detected.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A non-transitory computer-readable recording medium having stored therein an information processing program that causes a computer to execute a process comprising:
   extracting second data through executing a first process on first data including sensitive information, and storing the second data to a memory, the first data being stored in the memory and being read from the memory to be subjected to execute the first process, the first process being designated as a determination target process that is to be determined as whether or not the determination target process requires sensitive information;
   outputting fourth data obtained by executing the first process on third data, the third data being obtained by executing a second process to delete sensitive information on the first data being read from the memory; and
   comparing the second data being read from the memory with the fourth data, and determining, based on a result of comparing the second data being read from the memory with the fourth data by utilizing a relationship that the second data matches the fourth data when the first process does not require the sensitive data, whether or not the first process requires sensitive information.

2. The non-transitory computer-readable recording medium according to claim 1, the process further comprising:
   in a case where the second data is different from the fourth data, determining that the first process requires the sensitive information.

3. The non-transitory computer-readable recording medium according to claim 1, the process further comprising:
   receiving instruction designating the first process on the first data, as the determination target process; and
   in a case where the first process requires the sensitive information, outputting an alert.

4. The non-transitory computer-readable recording medium according to claim 1, the process further comprising:
   receiving instruction designating the first process on the first data, as the determination target process; and
   in a case where the first process does not require the sensitive information, outputting information related to the second process to delete the sensitive information from the first data or executing the second process on the first data.

5. An information processing method comprising:
   at a computer
   extracting second data through executing a first process on first data including sensitive information, and storing the second data to a memory, the first data being stored in the memory and being read from the memory to be subjected to execute the first process, the first process being designated as a determination target process that is to be determined as whether or not the determination target process requires sensitive information;
   outputting fourth data obtained by executing the first process on third data, the third data being obtained by executing a second process to delete sensitive information on the first data being read from the memory; and
   comparing the second data being read from the memory with the fourth data, and determining, based on a result of comparing the second data being read from the memory with the fourth data by utilizing a relationship that the second data matches the fourth data when the first process does not require the sensitive data, whether or not the first process requires sensitive information.

6. The information processing method according to claim 5, further comprising:
   at the computer,
   in a case where the second data is different from the fourth data, determining that the first process requires the sensitive information.

7. The information processing method according to claim 5, further comprising:
   at the computer,
   receiving instruction designating the first process on the first data, as the determination target process; and
   in a case where the first process requires the sensitive information, outputting an alert.

8. The information processing method according to claim 5, further comprising:
   at the computer,
   receiving instruction designating the first process on the first data, as the determination target process; and
   in a case where the first process does not require the sensitive information, outputting information related to the second process to delete the sensitive information from the first data or executing the second process on the first data.

9. An information processing apparatus comprising:
   a memory that stores a first data including sensitive information; and
   a processor coupled to the memory, the processor being configured to:
   extract second data through executing a first process on first data, and store the second data to the memory, the first data being read from the memory to be subjected to execute the first process, the first process being designated as a determination target process that is to be determined as whether or not the determination target process requires sensitive information;
   output fourth data obtained by executing the first process on third data, the third data being obtained by executing a second process to delete sensitive information on the first data being read from the memory; and
   compare the second data being read from the memory with the fourth data, and determine, based on a result of comparing the second data being read from the memory with the fourth data by utilizing a relationship that the second data matches the fourth data when the first process does not require the sensitive data, whether or not the first process requires sensitive information.

10. The information processing apparatus according to claim 9, wherein the processor is further configured to:
   in a case where the second data is different from the fourth data, determine that the first process requires the sensitive information.

11. The information processing apparatus according to claim 9, wherein the processor is further configured to:
   receive instruction designating the first process on the first data, as the determination target process; and
   in a case where the first process requires the sensitive information, output an alert.

12. The information processing apparatus according to claim 9, wherein the processor is further configured to:
   receive instruction designating the first process on the first data, as the determination target process; and
   in a case where the first process does not require the sensitive information, output information related to the second process to delete the sensitive information from the first data or execute the second process on the first data.

* * * * *